United States Patent [19]

Okahara

[11] Patent Number: 5,033,330

[45] Date of Patent: Jul. 23, 1991

[54] TRANSIENT CONTROL OF SHIFT IN AUXILIARY GEARING FOR QUICK ENGINE BRAKING

[75] Inventor: Hirofumi Okahara, Isehara, Japan

[73] Assignee: Nissan Motor Co., Ltd., Yokohama, Japan

[21] Appl. No.: 524,887

[22] Filed: May 18, 1990

[30] Foreign Application Priority Data

May 18, 1989 [JP] Japan .................................. 1-122724
May 18, 1989 [JP] Japan .................................. 1-122726

[51] Int. Cl.$^5$ ............................................. B60K 41/06
[52] U.S. Cl. ..................................... 74/867; 74/866; 74/868; 74/869
[58] Field of Search ................... 74/866, 867, 868, 869

[56] References Cited

U.S. PATENT DOCUMENTS

| 4,346,626 | 8/1982 | Kawamoto | 74/867 X |
| 4,474,084 | 10/1984 | Sugano et al. | 74/867 X |
| 4,706,523 | 11/1987 | Nishikawa et al. | 74/869 |
| 4,730,521 | 3/1988 | Hayasaki et al. | 74/867 |
| 4,790,215 | 12/1988 | Hamano | 74/866 |
| 4,856,381 | 8/1989 | Funahashi et al. | 74/867 |
| 4,882,952 | 11/1989 | Kashihara et al. | 74/867 |
| 4,967,356 | 10/1990 | Mori | 74/867 X |

FOREIGN PATENT DOCUMENTS 59-113351 6/1984 Japan .
62-159839 7/1987 Japan .

OTHER PUBLICATIONS

"Nissan Full-Range Electronically Controlled Automatic Transmission of the RE4R01A Type (A261C07)", published by Nissan Motor Co., Ltd. in Mar. 1987.

Primary Examiner—Leslie A. Braun
Assistant Examiner—Matthew Stavish
Attorney, Agent, or Firm—Foley & Lardner

[57] ABSTRACT

An accumulator is disposed in a fluid line leading from a shift valve to a reduction brake of an auxiliary gearing of an automatic transmission. A back-up pressure of the accumulator is modified upon setting an automatic transmission to an engine brake running range and/or a reverse drive range.

3 Claims, 6 Drawing Sheets

FIG. 2A

| RANGE | GEAR | OVERALL TRANSMISSION GEAR RATIO | EXAMPLE OF GEAR RATIO | STATE | R/C | H/C | F/C | OR/C | B/B | LR/B | F/OWC | L/OWC | AUXILIARY GEARING STATE | D/C | RD/B | RD/OWC |
|---|---|---|---|---|---|---|---|---|---|---|---|---|---|---|---|---|
| D, III, II -RANGES | 1 | $\dfrac{(1+\alpha_2)(1+\alpha_3)}{\alpha_2}$ | 3.857 | 1 | | | ○ | △ | | △ | | ○ | RED. | | ○ | ○ |
| D, III, II -RANGES | 2 | $\dfrac{\alpha_1\cdot\alpha_2+\alpha_1+\alpha_2(1+\alpha_3)}{\alpha_2(\alpha_1+1)}$ | 2.140 | 2 | | ○ | ○ | △ | | | ○ | | RED. | | ○ | ○ |
| D, III, II -RANGES | 3 | $1+\alpha_3$ | 1.384 | 3 (DIR.) | | ○ | ○ | △ | | | ○ | | RED. | | ○ | ○ |
| D, III, II -RANGES | 4 | $1$ | 1.000 | 3 (DIR.) | | ○ | ○ | △ | | | ○ | | DIR. | ○ | | |
| D, III, II -RANGES | 5 | $\dfrac{1}{1+\alpha_1}$ | 0.694 | 4 | | | | | ○ | | ○ | | DIR. | ○ | | |
| | R | $\dfrac{\alpha_3+1}{-\alpha_1}$ | -3.146 | REV. | ○ | | | | | ○ | | | RED. | | ○ | ○ |
| | N | — | — | NEUT. | | | | | | | | | RED. | | ○ | ○ |
| | P | — | — | NEUT. | | | | | | | | | RED. | | ○ | ○ |

○: ENGAGED/ACTIVE, △: ENGAGED DURING ENGINE BRAKING
DIR.: DIRECT DRIVE, REV: REVERSE,
RED.: REDUCTION GEAR STATE, NEUT.: NEUTRAL

PRESSURE TO RD/B

A: ACC. PISTON STROKE
S: RD/B SERVO PISTON STROKE

TRANSIENT CONTROL OF SHIFT IN AUXILIARY GEARING FOR QUICK ENGINE BRAKING

BACKGROUND OF THE INVENTION

The present invention relates to an automatic transmission including an auxiliary gearing, and more particularly to a hydraulic control for quick shift to engine braking or reverse drive in such an automatic transmission.

JP 59-113351 A discloses an automatic transmission including an auxiliary gearing drivingly connected in series to a main gearing.

In this known automatic transmission, the auxiliary gearing is shiftable between a high gear position and a low gear position. It includes a direct clutch as a first frictional unit to be engaged in the high gear position, and a reduction brake as a second frictional unit to be engaged in the low gear position. The high gear position is established in the auxiliary gearing when the direct clutch is engaged with the reduction brake released, while the low gear position is established in the auxiliary gearing when the direct clutch is released with the reduction brake engaged. The auxiliary gearing provides a direct drive in the high gear position, while it provides a reduction gear in the low gear position. The auxiliary gearing also includes a one-way clutch which becomes operative to serve as a substitute for the reduction brake during engine driving in the forward drive. During a shift in the auxiliary gearing from the low to high gear position by disengaging or releasing the reduction brake and engaging the direct clutch, the one-way clutch anchors a rotary member which is to be gripped by the direct clutch. This prevents excessive wear of the direct clutch and reduces a shock taking place during engagement of the direct clutch.

During engine drive running in the forward drive, the one-way clutch accomplishes the same function as the reduction brake does, so it is not necessary to keep the reduction brake engaged. Therefore, it is during engine brake running in the forward drive or during running in the reverse drive that the reduction brake has to be engaged.

If, in order to condition the auxiliary gearing in the low gear position during engine drive forward running, the reduction brake is released, there has to be set an additional control mode where both the reduction brake and direct clutch are disengaged or released in addition to two control modes, namely, a control mode where the direct clutch is engaged with the reduction brake released to condition the auxiliary gearing in the high gear position, and a control mode where the reduction brake is engaged with the direct clutch released to condition the auxiliary gearing in the low gear position during the engine brake forward running. In order to make a switch among the above-mentioned three control modes, a plurality of valves are required for shifting the auxiliary gearing between the high and low gear positions, resulting in a complicated hydraulic control system.

In order to reduce the control modes, in number, it has been the common practice to engage the reduction brake to condition the auxiliary gearing in the low gear position not only during engine brake running, but also during the engine drive forward running.

An example embodying this common practice is described referring to FIG. 5. In FIG. 5, a shift valve SFV, a reduction brake RD/B, a direct clutch D/C, one-way orifices OWO1 and OWO2, and accumulators ACC1 and ACC2 are illustrated. The shift valve SFV assumes one position when a low gear position command pressure signal $P_{LS}$ is supplied thereto. In this position of the shift valve SFV, a line pressure $P_L$ is allowed to cause engagement of the reduction brake RD/B, while the direct clutch D/C is allowed to communicate with a drain port and released, conditioning the auxiliary gearing in the low gear position. The shift valve SFV switches and assumes the opposite position when a high gear position command pressure signal $P_{HS}$ is supplied thereto. In this opposite position of the shift valve SFV, the reduction brake RD/B is allowed to communicate with a drain port and released, while the line pressure $P_L$ is allowed to cause engagement of the direct clutch D/C, conditioning the auxiliary gearing in the high gear position. With the one-way orifice OWO1 and accumulator ACC1, a build-up of hydraulic pressure applied to the reduction brake RD/B is controlled, while the one-way orifice OWO2 and accumulator ACC2 control a build-up of hydraulic pressure applied to the direct clutch D/C. Accordingly, the auxiliary gearing is shiftable between the low and high gear positions without any substantial shock.

As mentioned before, the one-way clutch is arranged in parallel to the reduction brake RD/B to complement the action of the reduction brake RD/B. Engagement timing of the reduction brake RD/B is hereinafter considered.

Assuming that, during engine drive forward running, the auxiliary gearing shifts from the high gear position to the low gear position owing to engagement of the reduction brake after releasing the direct clutch. Since the one-way clutch serves as a substitute for the reduction brake during engine drive forward running, it is required that the reduction brake is engaged upon expiration of a considerable time after the direct clutch has been released for the purpose of preventing interlock of the auxiliary gearing. If the auxiliary gearing interlocks, a great shock is induced.

Assuming that, during engine brake forward running or reverse running, the auxiliary gearing shifts from the high gear position to the low gear position. Since, in this situation, the one-way clutch is not operable, it is required that the reduction brake is engaged immediately after the direct clutch has been released.

The above-mentioned two requirements have to be compromised in the conventional hydraulic control system. Referring again to FIG. 4, the pressure build-up in the reduction brake RD/B is always controlled by the one-way orifice OWO1 and accumulator ACC1. Thus, it is impossible to set two different engagement timings of the reduction brake RD/B which are suitable during engine drive forward running and during engine braking, respectively. If the priority is placed on engine braking performance, a relatively great shock is induced when the auxiliary gearing shifts from the high gear position to the low gear position during engine drive forward running. On the contrary, if the priority is placed on the engine drive forward running performance, a poor engine braking performance results. Thus, it is difficult to compromise between the above two requirements.

An object of the present invention is to improve an automatic transmission such that the above-mentioned two requirements are met.

SUMMARY OF THE INVENTION

According to the present invention, there is provided an automatic transmission for a motor vehicle with an engine, the automatic transmission being shiftable between an automatic drive range and an engine braking range and having a reverse drive range, the automatic transmission, comprising:

a main gearing;

an auxiliary gearing drivingly connected to said main gearing, said auxiliary gearing having a high gear position and a low gear position, and being shiftable from said high gear position to said low gear position owing to disengagement of a first frictional device and engagement of a second frictional device, said auxiliary gearing including a rotary member and a one-way clutch means for acting on said rotary member to complement an action of said second frictional device during engine driving in the automatic drive range;

means for controlling a transient increase in a hydraulic pressure acting on said second frictional device in a predetermined pattern when the automatic transmission has the automatic drive range such that said one-way clutch means becomes operative to act on said rotary member before said second frictional device grips said rotary member;

said transient increase controlling means including means for changing said predetermined pattern to a second pattern upon setting the automatic transmission to at least one of the engine brake running range and the reverse drive range such that said second frictional device grips said rotary member immediately after disengagement of said first frictional device.

BRIEF DESCRIPTION OF THE DRAWINGS

FIG. 2A is a table illustrating a shift schedule;

DESCRIPTION OF THE PREFERRED EMBODIMENT

Figure 2:
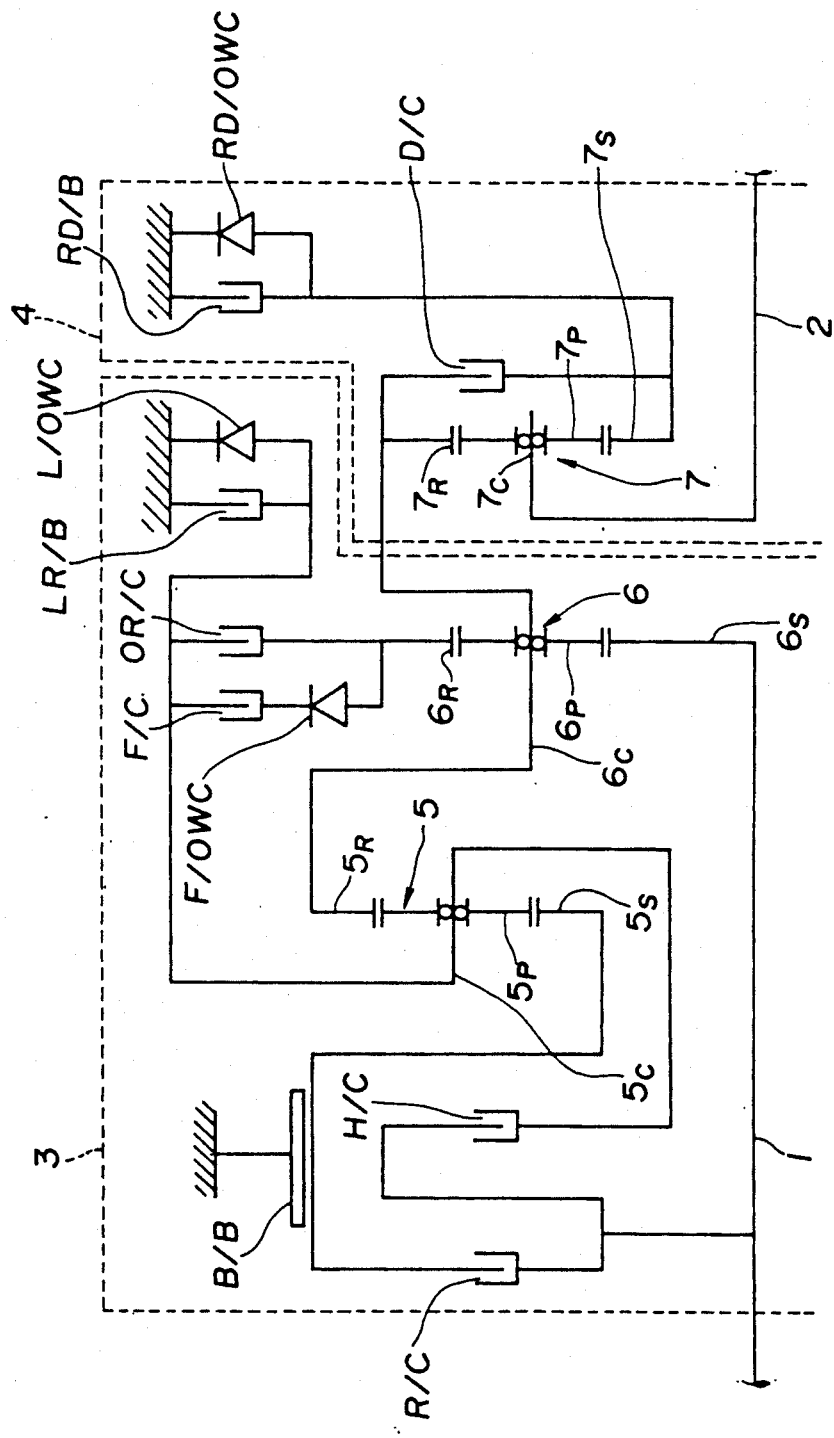
FIG. 2 is a schematic view of a main gearing and an auxiliary gearing of the automatic transmission.

Referring to the accompanying drawings and more particularly to FIG. 2, the automatic transmission comprises an input shaft 1 and an output shaft 2 arranged in line with the input shaft 1. It also comprises a main planetary gearing 3 arranged coaxially with the input shaft 1, and an auxiliary planetary gearing 4 arranged coaxially with the output shaft 2.

The main gearing 3 is the same, in construction, as that of an automatic transmission described on pages I-1 to I-53 of a service manual entitled "NISSAN FULL-RANGE ELECTROCICALLY CONTROLLED AUTOMATIC TRANSMISSION OF THE RE4R-01A TYPE (A261C07)" published by Nissan Motor Co. Ltd., in 1987. The same gear train is disclosed in U.S. Pat. No. 4,730,521 issued on Mar. 15, 1988 to Hayasaki et al.

As shown in FIG. 2, the main gearing 3 comprises two planetary gear sets, namely a first planetary gear set 5 and a second planetary gear set 6. These planetary gear sets are in the form of a simple planetary gear set. The first planetary gear set includes a first sun gear $5_S$, a first ring gear $5_R$, a plurality of pinions, only one being shown at $5_P$, meshing with both the sun and ring gears $5_S$ and $5_R$, and a first carrier $5_C$ rotatably supporting the pinions $5_P$. The second planetary gear set includes a first sun gear $6_S$, a first ring gear $6_R$, a plurality of pinions, only one being shown at $6_P$, meshing with both the sun and ring gears $6_S$ and $6_R$, and a first carrier $6_C$ rotatably supporting the pinions $6_P$.

The sun gear $5_S$ is adapted to be held stationary by a band brake B/B, and it is connectable to the input shaft 1 by a reverse clutch R/C. The carrier $5_C$ is connectable to the input shaft 1 by a high clutch H/C, and it is prevented from rotating in a direction opposite to a direction in which the input shaft 1 rotates owing to the action of a low one-way clutch L/OWC. This carrier $5_C$ is adapted to be held stationary by means of a low reverse brake LR/B. The carrier $5_C$ is connectable to an outer race of a forward one-way clutch F/OWC which has its inner race connected to the ring gear $6_R$. The ring gear $6_R$ is connectable to the carrier $5_C$ by means of an overrunning clutch OR/C. The sun gear $6_S$ is connected to the input shaft 1.

The auxiliary gearing 4 comprises a third planetary gear set 7 which is in the form of a simple planetary gear set including a third sun gear $7_S$, a third ring gear $7_R$, a plurality of pinions, only one being shown at $7_P$, each meshing with both the sun and ring gears $7_S$ and $7_R$. The ring gear $7_R$ is connected to the carrier $6_C$ that servers as an output element of the main gearing 3. The carrier $7_C$ is connected to the output shaft 2. The ring gear $7_R$ is connectable to the sun gear $7_S$ by a direct clutch D/C. A reduction one-way clutch RD/B is arranged in parallel to a reduction brake with respect to the sun gear $7_S$. This one-way clutch RD/B prevents the sun gear $7_S$ from rotating in a direction opposite to the direction in which the input shaft 1 rotates, although it allows the sun gear $7_S$ to rotate in the same direction as the input shaft 1 does. The reduction brake RD/B is constructed and arranged as to hold the sun gear $7_S$ stationary.

The automatic transmission has five gear positions or five speeds and a single reverse gear position or reverse speed. In accordance with a schedule TABLE shown in FIG. 2A, an appropriate one or ones of the clutches and brakes are engaged to establish a desired one of the gear positions when a driver manipulates a manual valve to place its spool to one of a plurality of forward drive range positions, namely a drive (D) position, three (III) and two (II) engine braking position, and a reverse (R) drive position. Upon selecting a neutral (N) position or a parking (P) position, all of the clutches and brakes related to the main planetary gear box 3 are released, interrupting transmission of power to the auxiliary planetary gearing 4.

The operation of the main and auxiliary gearings 3 and 4 is explained.

The main gearing 3 operates as follows:

For establishing a first gear position in the main gearing 3, the forward clutch F/C is engaged. This connects the forward one-way clutch F/OWC in series with the low one-way clutch L/OWC, preventing the ring gear $6_R$ from rotating in the opposite direction to the direction in which the input shaft 1 rotates. Since the ring gear $6_R$ serves as a reaction member and the sun gear $6_S$ is rotatable with the input shaft 1, rotation of the input shaft 1 causes the pinions $6_P$ to turn about their axes and orbit around the sun gear $6_S$ in the same direction as the direction in which the sun gear $6_S$ rotates, causing the carrier $6_C$ to rotate, at a reduced speed, in the same direction as the direction in which the sun gear $6_S$ rotates. Thus, the first gear position is established in the main gearing. Assuming now that a gear ratio between the sun gear $6_S$ and the ring gear $6_R$ is $\alpha_2$ (alpha 2), the reduction ratio at the first gear position can be expressed as $(1+\alpha_2)/\alpha_2$. Engine braking is not produced under this condition since the one-way clutches F/OWC and L/OWC allow the carrier $6_C$ to rotate at a speed higher than the input shaft 1 does.

If engine braking is desired, it is necessary that the overrunning clutch OR/C and low reverse brake LR/B are both engaged as indicated by triangles in the TABLE shown in FIG. 2A.

In order for an upshift to the second gear position in the main gearing 3, the band brake B/B is engaged with the forward clutch F/C kept engaged, holding the sun gear $5_S$ stationary. Since the sun gear $5_S$ serves as a reaction member and the ring gear $6_R$ is still prevented from rotating in the opposite direction, the carrier $6_C$ increases its speed. With the same speed of rotation of the input shaft 1, a speed at which the carrier $6_C$ rotates at the second gear position is higher than a speed at which it rotates at the first gear position. Assuming now that a gear ratio between the sun gear $5_S$ and the ring gear $5_R$ is $\alpha_1$ (alpha 1), a reduction ratio for the second gear position can be expressed as $(\alpha_1 \cdot \alpha_2 + \alpha_1 + \alpha_2)/\alpha_2(1+\alpha_1)$.

If engine braking is desired at the second gear position, it is necessary that the overrunning clutch OR/C is engaged as indicated by a triangle in the TABLE shown in FIG. 2A.

In order for an upshift to a third gear position or direct drive in the main gearing 3, the high clutch H/C is engaged and the band brake B/B is released with the forward clutch F/C kept engaged. This causes the ring gear $6_R$ to rotate in unison with the sun gear $6_S$ connected to the input shaft 1.

If engine braking is desired under this direct drive condition, it is necessary that the overrunning clutch OR/C is engaged.

In order for an upshift to a fourth gear position (overdrive) in the main gearing 3, the band brake B/B is engaged with the high clutch H/C and forward clutch F/C kept engaged. Since the carrier $5_C$ is connected to the input shaft 1 and the sun gear $5_S$ is held stationary, rotation of the carrier $5_C$ with the input shaft 1 causes the ring gear $5_R$ and thus the carrier $6_C$ to rotate in the same direction as the direction in which the input shaft 1 rotates. The reduction ratio for ths fourth gear position (overdrive) can be expressed as $1/(1+\alpha_1)$. Since the ring gear $6_R$ is allowed to rotate quicker than the carrier $5_C$ rotates owing to the forward one-way clutch F/OWC, the forward clutch F/C may be kept engaged.

For establishing the reverse drive in the main gearing 3, the reverse clutch R/C and low reverse brake LR/B are engaged. Owing to the engagement of the reverse clutch R/C, the sun gear $5_S$ rotates in unison with the input shaft 1. Since the carrier $5_C$ is held stationary owing to the action of the low reverse brake LR/B, rotation of the sun gear $5_S$ causes the ring gear $5_R$ and thus the carrier $6_C$ to rotate in the opposite direction to the direction in which the input shaft 1 rotates. The reduction ratio for the reverse drive can be expressed as $-1/\alpha_1$.

The operation of the auxiliary gearing 4 is explained.

With the reduction brake RD/B engaged to hold the sun gear $7_S$ stationary, the auxiliary gearing 4 is conditioned in a low gear position (or a reduction gear). In the low gear position, rotation of the carrier $6_C$ transmitted to the ring gear $7_R$ causes the pinions $7_P$ to turn about their axes to orbit around the sun gear $7_S$, causing the carrier $7_C$ and thus the output shaft 2 to rotate at a reduced speed. Thus, the reduction brake RD/B function as a frictional device for establishing the low gear position in the auxiliary gearing 4. A reduction ratio within the auxiliary gearing 4 can be expressed as $1+\alpha_3$ if a gear ratio between the sun gear $7_S$ and the ring gear $7_R$ is $\alpha_3$ (alpha 3).

With the direct clutch D/C engaged with the reduction brake RD/B released, the sun gear $7_S$ is connected to the ring gear $7_R$, and the auxiliary gearing 4 is conditioned in a high gear position (or a direct drive). In the high gear position, the rotation of the carrier $6_C$ causes the output shaft 2 to rotate at the same speed. Thus, the direct clutch D/C serves as a frictional device for establishing the high gear position in the auxiliary gearing 4.

During a shift from engagement state of the reduction brake RD/B to disengagement state thereof, if the sun gear $7_S$ starts rotating in the opposite direction prior to engagement of the direct clutch D/C, the direct clutch D/C wears at a quick rate. Besides, a substantially great shock takes place during engagement of the direct clutch D/C. In order to solve this problem, the one-way clutch RD/OWC is arranged to prevent such undesired rotation of the sun gear $7_S$.

Since the one-way clutch RD/OWC serves the same function as the reduction brake RD/B does in a certain circumstance, it is not necessary to engage the reduction brake RD/B in such circumstance. However, for less complicated hydraulic control system, the reduction brake RD/B is left engaged in the above-mentioned circumstance. This results in two operation modes only, namely, a first mode where the direct clutch D/C is engaged and the reduction brake RD/B released, a second mode where the reduction brake RD/B is engaged and the direct clutch D/C released.

Describing gear positions established in the overall automatic transmission including the main and auxiliary gearings 3 and 4, the first gear position (ultra low) is established when the main gearing 3 is conditioned in the first gear position and the auxiliary gearing 4 is conditioned in the low gear position. A reduction ratio for the first gear position can be expressed as $(1+\alpha_2)(1+\alpha_3)/\alpha_2$. With the auxiliary gearing 4 kept as it is, if the main gearing 3 is shifted to the second gear position thereof and then to the third gear position (direct drive) thereof, the overall automatic transmission shifts to a second gear position and then to a third gear position. A reduction ratio for the second gear position can be expressed as $(\alpha_1 \cdot \alpha_2 + \alpha_1 + \alpha_2)(1+\alpha_3)/\alpha_2(\alpha_1+1)$. A reduction ratio for the third gear position can be expressed as $1+\alpha_3$. With the main gearing 3 kept in the third gear position (direct drive), if the auxiliary gearing 4 is shifted to the high gear position (direct drive), the overall automatic transmission is shifted to the fourth gear position (direct drive). With the auxiliary gearing 4 kept in the high gear position, if the main gearing 3 is shifted to the fourth gear position (overdrive), the overall automatic transmission is shifted to the fifth gear position with a reduction ratio expressed as $1/(1+a_1)$.

With the auxiliary gearing 4 kept in the low gear position, if the main gearing 3 is conditioned in the reverse drive, the overall automatic transmission is shifted to the reverse drive with a reduction ratio expressed as $-(a_3+1)/a_1$.

In this embodiment, the gear ratios $a_1$, $a_2$, $a_3$ are chosen to be appropriate values, namely, 0.441, 0.560, 0.384, falling in a range from 0.4 to 0.6, which range is empirically determined as being suitable for strength and endurability of the planetary gear sets 5, 6 and 7. As will be appreciated from the values for the reduction ratios as tabulated in FIG. 2A, the appropriate reduction ratios are provided with a sufficiently large span between the first gear position and fifth gear position.

Figure 1A:
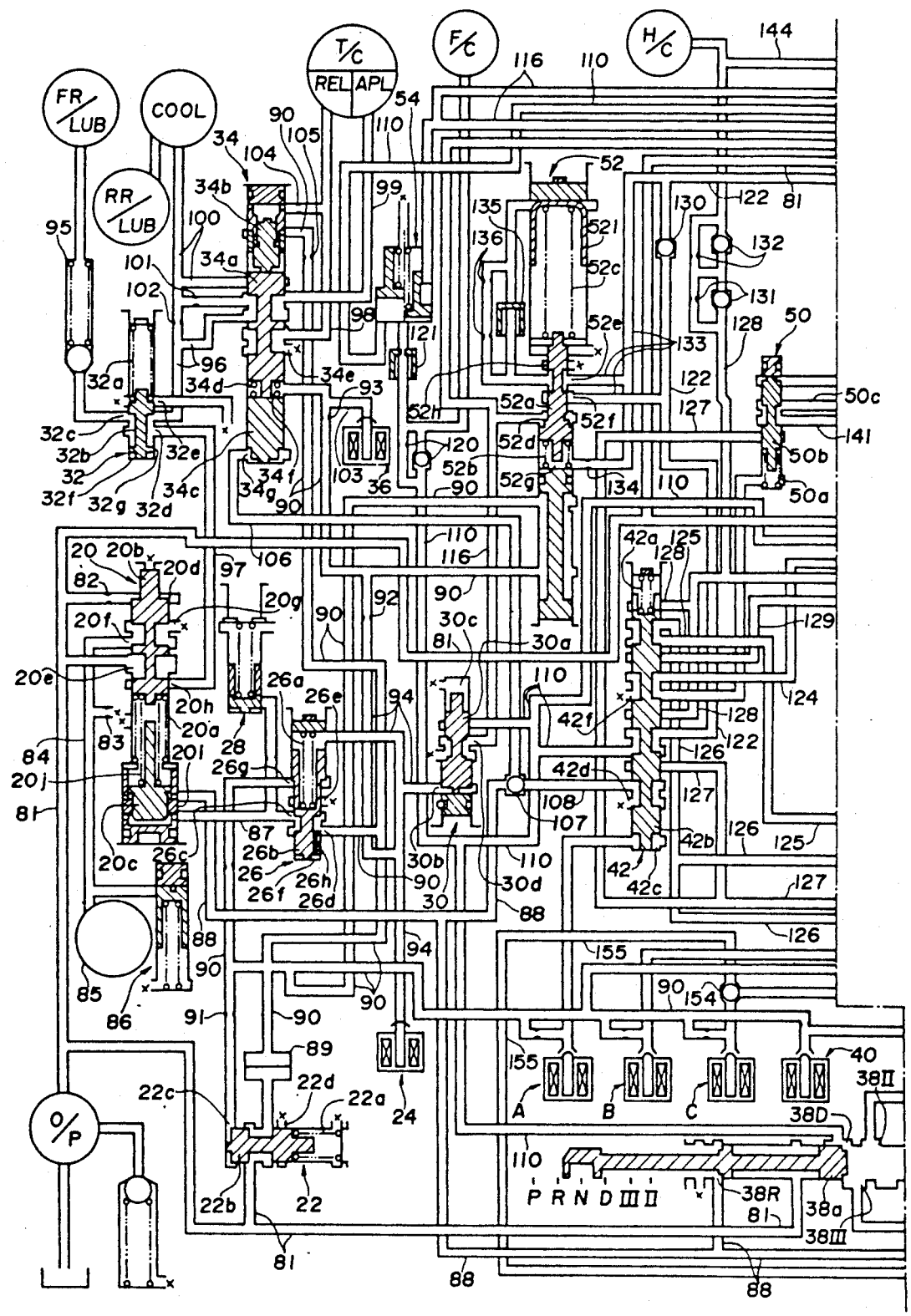
FIGS. 1A and 1B, when combined side by side, are a hydraulic circuit illustrating a hydraulic control system for an automatic transmission embodying the present invention.
Figure 1B:
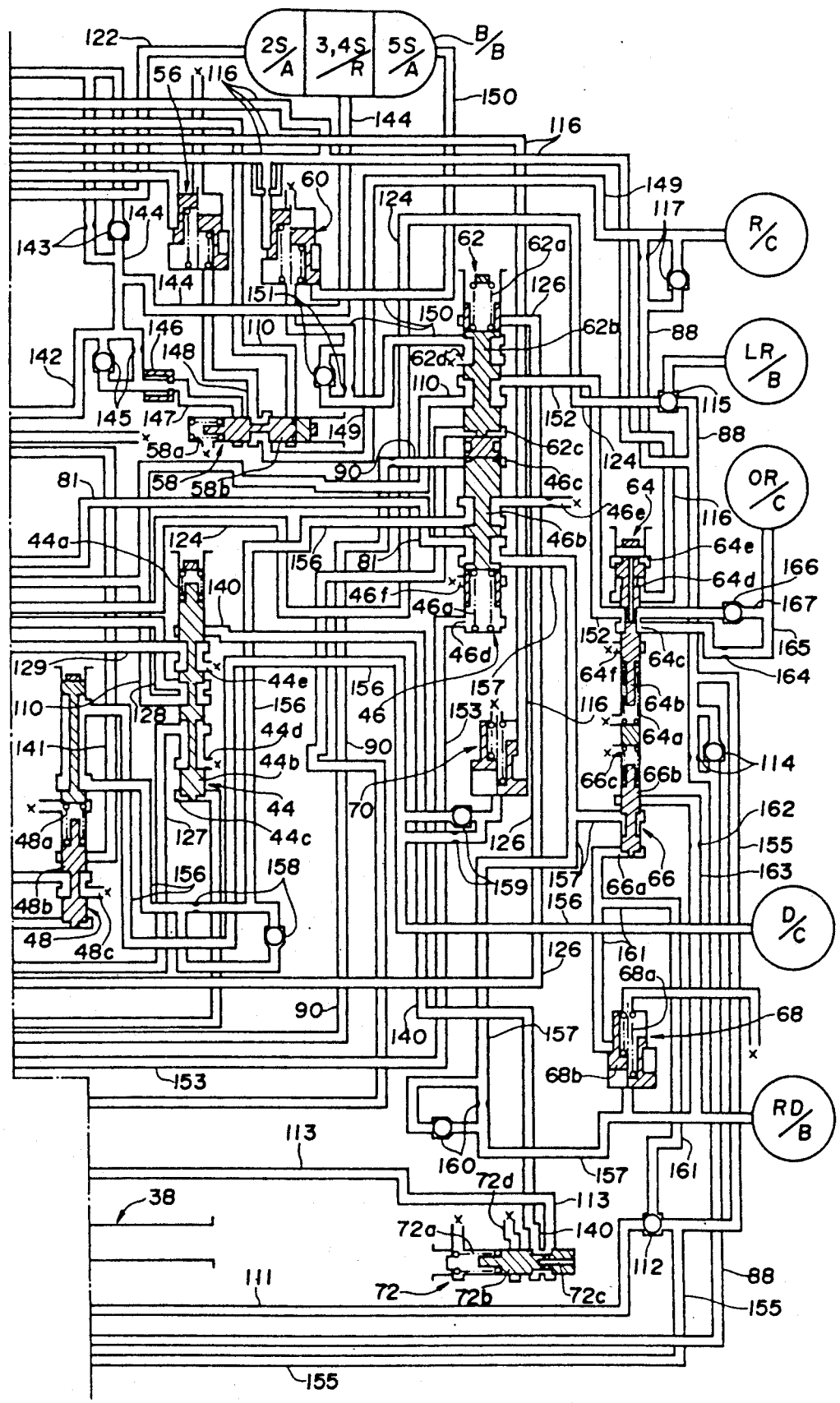

Referring to FIGS. 1A and 1B, the hydraulic control system is described. The hydraulic control system comprises the following components:

a pump O/P;
a pilot valve 22;
a pressure regulator valve 20;
a duty solenoid 24;
a pressure modifier valve 26;
a modifier accumulator 28;
an accumulator control valve 30;
a torque converter relief valve 32;
a lock-up control valve 34;
a lock-up solenoid 36;
a manual valve 38;
a first shift solenoid A;
a second shift solenoid B;
a third shift solenoid C;
an overrunning clutch solenoid 40;
a first shift valve 42;
a second shift valve 44;
a third shift valve 46;
a 5-2 relay valve 48;
a 5-2 sequence valve 50;
a 1-2 accumulator valve 52;
a N-D accumulator 54;
an accumulator 56;
an accumulator shift valve 58;
an accumulator 60;
an overrunning clutch control valve 62;
an overrunning clutch pressure reduction valve 64;
a reduction timing valve 66;
a reduction brake accumulator 68;
a direct clutch accumulator 70; and
a I & II range pressure reduction valve 72.

The components listed as above are connected to a torque converter T/C, forward clutch F/C, high clutch H/C, band brake B/B, reverse clutch R/C, low reverse brake LR/B, overrunning clutch OR/C, direct clutch D/C and reduction brake RD/B, as illustrated in FIGS. 1A and 1B.

The torque converter T/C is of the well-known lock-up type and has a release chamber REL and an apply chamber APL. Supply of hydraulic fluid to the release chamber REL and discharge thereof from the apply chamber APL cause the torque converter T/C to assume a torque converter state. On the contrary, supplying the hydraulic fluid to the apply chamber APL and discharging same from the release chamber REL cause the torque converter T/C to assume a lock-up state.

Figure 3:
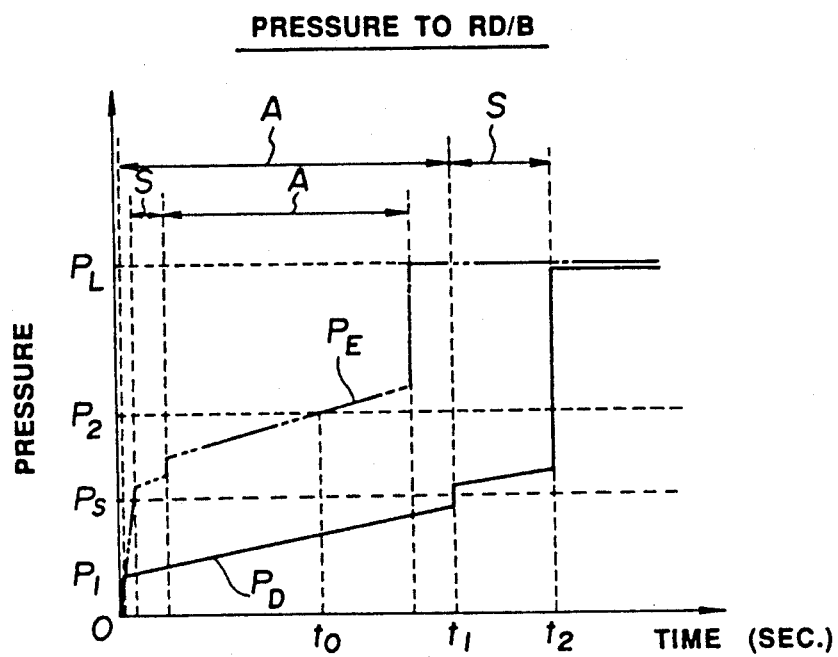
FIG. 3 is a time chart illustrating a build-up of a hydraulic pressure supplied to a reduction brake RD/B during engine drive forward running (see fully drawn line $P_D$) and that during engine brake forward running (see two-dot chain line $P_E$)
Figure 5:
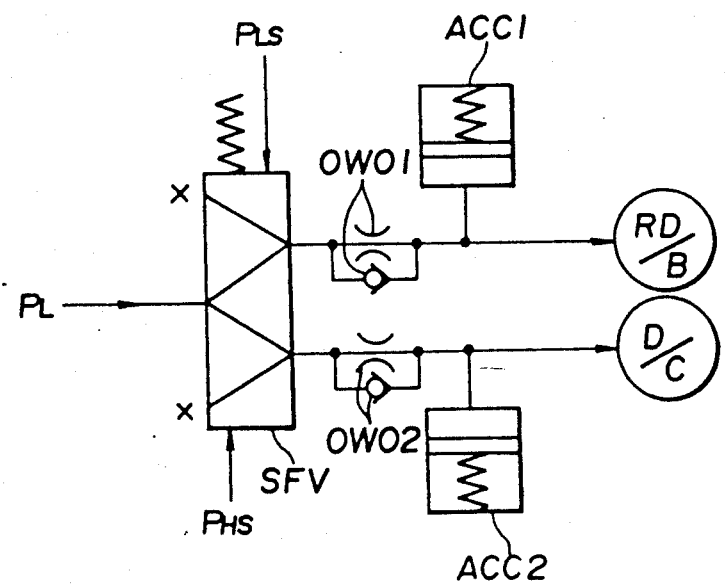
FIG. 5 is a portion of a hydraulic control system according to the prior art discussed before.

The band brake B/B is activated by a servo actuator which is substantially the same as a servo actuator shown in FIG. 3 of U.S. Pat. No. 4,730,521 issued to Hayasaki et al., on Mar. 15, 1988. The servo actuator for the band brake B/B has a servo apply chamber 2S/A adapted to be pressurized for establishing the second gear position in the automatic transmission, a servo release chamber 3,4S/R (corresponding to a servo release chamber 3S/R of the U.S. Pat. No. 4,730,521) adapted to be pressurized for establishing the third or fourth gear position in the automatic transmission, and a servo apply chamber 5S/A (corresponding to a servo apply chamber 4S/A of the U.S. Pat. No. 4,730,521) adapted to be pressurized for establishing the fifth gear position in the automatic transmission. Upon application of hydraulic pressure to the servo apply chamber 2S/A only, the band brake B/B is engaged. When the servo release chamber 3,4S/R is pressurized with the servo apply chamber 2S/A kept pressurized, the band brake B/B is released. When the servo apply chamber 5S/A is pressurized with the other two chambers 2S/A and 3,4S/R kept pressurized, the band brake B/B is engaged again.

The pressure regulator valve 20 is formed with a valve bore and comprises a spool 20b and a plug 20c disposed in the valve bore. Springs 20a and 20j are disposed in the valve bore between the spool 20b and the plug 20c to bias the spool 20b to a spring set position thereof as illustrated in FIG. 1A. Viewing in FIG. 1A, the spring 20b has a lower end bearing against a spring retainer fixed to the valve bore defining wall and an upper end bearing against the spool 20b, while the other spring 20j has a lower end bearing against the plug 20c and an upper end bearing against the spool 20b. The pressure regulator valve 20 is supplied with hydraulic fluid discharged to a line pressure fluid line 81 by the pump O/P and effects a pressure regulation to adjust a pressure of the hydraulic fluid in the line pressure fluid line 81 to a value that is a function of and thus variable with a force with which the spool 20b is biased by the springs 20a and 20j. The force with which the spring 20j biases the spool 20b is increased in response to a movement of the plug 20c towards the spool 20b. The fluid pressure within the line pressure fluid line 81, hereinafter referred to as a line pressure, is increased accordingly. The spool 20b has a pressure acting area 20d which is exposed to the hydraulic fluid downstream of an orifice 82. In accordance with the hydraulic pressure applied to the pressure acting area 12d, the spool 20b is urged downwards as viewed in FIG. 1A against the action of the springs 20a and 20j. The pressure regulator valve 20 has ports 20g, 20f, 20e and 20h formed in the valve bore defining wall within an area within which the spool 20b is adapted to move. The port 20e is connected to the line pressure fluid line 81, and arranged such that it communicates with the port 20h as the spool 20b begins to move downwards and with the port 20f also as the spool 20b moves downwards further, as viewed in FIG. 1A. The port 20g serves as a drain port. The arrangement among the ports 20g, 20f, and 20e is such that the port 20g is gradually covered as the spool 20b moves downwards from the illustrated position in FIG. 1A and it is completely covered when the spool 20b assumes a predetermined position. At the predetermined position or immediately after the spool 20b has assumed this predetermined position during this downward movement thereof, the port 20e is about to communicate with the port 20f, and further subsequent movement causes the fluid communication between the ports 20e and 20f to increase. The port 20f is connected to a fluid line 84 at one end thereof. The opposite end of this fluid line 84 is connected to the capacity control actuator 85. A bleeder 83 is open to the fluid line 84 at a portion between the one and the opposite ends. In order to suppress pulsation of the hydraulic fluid pressure within the fluid line 84, a feedback accumulator 86 is connected to the fluid line 81 at a portion downstream of that portion where the bleeder 83 is arranged.

The pump O/P is a variable volume vane pump which is driven by the engine. An eccentricity within the pump O/P is decreased by the actuator 85 when the hydraulic pressure applied to the actuator 85 exceeds a certain value. This causes a reduction in capacity of the pump O/P.

The plug 20c of the pressure regulator valve 20 has a lower end, as viewed in FIG. 1A, serving as a pressure acting area exposed to a modifier pressure supplied to the pressure regulator valve 20 from a modifier pressure fluid line 87. It is formed with another pressure acting area 20i which is exposed to a hydraulic pressure supplied to the pressure regulator valve 20 from a reverse-select fluid line 88. The plug 20c is urged upwards as viewed in FIG. 1A in response to one of these two hydraulic pressure, thus compressing the spring 20j.

With the pressure regulator valve 20 in the illustrated spring set position, immediately after hydraulic fluid is discharged by the pump O/P. this hydraulic fluid flows into the fluid line 81. As long as the spool 20b stays in the illustrated spring set position, the hydraulic fluid is trapped, causing the hydraulic pressure in the fluid line 81 to increase. This pressure is transmitted via the orifice 82 to the pressure acting area 20d, urging the spool 20b downwards against the springs 20a and 20j, uncovering the port 20h to allow same to communicate with the port 20e. Then, the hydraulic fluid is discharged via the port 20h, causing a drop in the hydraulic pressure within the fluid line 81. This drop in the hydraulic pressure allows the spool 20b to move back and upwards owing to the action of the springs 20a and 20j. These movements of the spool 20b are repeated until the hydraulic pressure within the fluid line 81 becomes equal to a value that is a function of the total force with which the springs 20a and 20j bias the spool 20a. The plug 20c is subject to an upward force owing to the modifier pressure from the fluid line 87. Thus, the force with which the spring 20j biases the spool 20b increases in proportion to the modifier pressure in the fluid line 87. Since the modifier pressure is available during all drive ranges but the reverse (R) drive range and increases in proportion to an increase in a load on the engine (or an engine output torque), the magnitude of the line pressure within the fluid line 81 increases in response to an increase in the engine load during all of the drive ranges except the reverse (R) drive range.

Upon selecting the reverse drive, the hydraulic pressure as high as the line pressure is applied to the plug 20c from the fluid line 88, urging the plug 20c upward viewing in FIG. 1A. Thus, the line pressure in the fluid line 81 is increased to a value suitable for reverse drive.

When the engine revolution speed exceeds a predetermined value, the pump O/P driven by the engine discharges hydraulic fluid into the fluid line 81 at an excessive rate. Under this condition, the hydraulic pressure within the fluid line 81 tends to increase to an excessively high value. This causes the spool 20 further downwards to increase fluid communication between the ports 20f and 20e, allowing a build up of a feedback pressure in the fluid line 84. This feedback pressure increases as the revolution speed of the pump O/P increases, causing the actuator 85 to decrease the eccentricity within the pump O/P, thus decreasing the capacity of the pump O/P. Thus, when the revolution speed of the pump O/P is higher than a certain value, the flow rate of hydraulic fluid discharged by the pump O/P is kept substantially constant owing to the capacity control, preventing a power loss of the engine.

The line pressure within the fluid line 81 is supplied to the pilot valve 22, the manual valve 38, the third shift valve 46 and the accumulator 56.

The pilot valve 22 comprises a spool 22b biased by a spring 22a to a spring set position as illustrated in FIG. 1A. The spool 22b has one end defining a chamber 22c and exposed thereto. The pilot valve 22 is provided with a drain port 22d, and connected to a pilot pressure line 90 with a filter 89. The pilot pressure line 90 is connected via an orifice 91 to the chamber 22c.

FIG. 1A illustrates the pilot valve 22 in the spring set position. The pilot valve 22 functions to effect a pressure regulation based on the hydraulic fluid supplied thereto from the fluid line 81 to generate a pilot pressure in the fluid line 90. The hydraulic fluid supplied from the fluid line 81 enters the pilot pressure line 90 and flows via the orifice 91 to the chamber 22c. If a hydraulic pressure within the chamber 22c increases, the spool 22b moves to the right as viewed in FIG. 1A against the spring 22a. When this pressure exceeds a constant value that is a function of a force of the spring 22a, the spool 22b uncovers the drain port 22d, causing a drop in the pressure in the pilot pressure line 90. Thus, the hydraulic pressure in the pilot pressure line 90 is kept at this constant value. This hydraulic pressure is called "a pilot pressure." This pilot pressure is distributed through the pilot pressure line 90 to the shift solenoids A, B, C, overrunning clutch solenoid 40, pressure modifier valve 26, orifices 92, 93, lock-up control valve 34, lock-up solenoid 36, and third shift valve 46.

The duty solenoid 24 has a drain line 94 leading from a drain port to the orifice 92. Normally, i.e., when it is turned OFF or deenergized, the duty solenoid 24 closes the drain port of the drain line 94. When it is turned ON or energized, the duty solenoid 24 opens the drain port of the drain line 94. This duty solenoid 24 and the other solenoids described later are controlled by a computer. The control strategy is such that as a duty ratio increases, a hydraulic pressure within the drain line 94 drops. The duty ratio is a ratio of a duration of time when a solenoid is turned ON to a predetermined ON-OFF cycle time and expressed in terms of percentage. Specifically, when the duty ratio is 0%, the hydraulic pressure within the drain line 94 is kept as high as the pilot pressure, while, when the duty ratio 100%, the hydraulic pressure within the drain line 94 is 0 (zero). The duty ratio is related to the magnitude of the engine load (for example, opening degree of the engine throttle valve) such that during all drive ranges but the reverse (R) drive range, the duty ratio is decreased as the magnitude of engine load increases, causing the hydraulic pressure within the drain line 94 to increase as the magnitude of engine load increases. During reverse (R) drive range, the duty ratio is kept at 100%, thus causing the hydraulic pressure within the drain line 64 to be 0 (zero).

The pressure modifier valve 26 comprises a spool 26b assuming a spring set position as illustrated in FIG. 1A owing to a spring 26a and the hydraulic pressure within the drain line 94. The pressure modifier valve 26 also comprises an outlet port 26c connected to the pressure modifier line 87, an inlet port 26d connected to the pilot pressure line 90, a port 26g, and a drain port 26e. The spool 26b defines a feedback chamber 26f and has an end exposed to same. Axially formed through the spool 26b is an orifice bore 26h having one end communicating with the modifier pressure line 87 and an opposite end communicating with the feedback chamber 26f. The spool 26b is formed with a pressure acting area exposed to the pilot pressure supplied to the port 26g. A force with which the spring 26a biases the spool 26b is opposed to a force with which the pilot pressure acting via the port 26g on the pressure acting area of the spool 26b.

The spool 26b of the pressure modifier valve 26 is subject to the force owing to the spring 26a and another force owing to the hydraulic pressure within the drain line 94 and urged downwards as viewed in FIG. 1A. The spool 26b is subject to a force owing to the modifier pressure within the feedback chamber 26f and the force owing to the pilot pressure supplied to the port 26g and urged upwards as viewed in FIG. 1A. If the total of the forces urging the spool 26b downwards tends to be greater than the total of the forces urging the spool 26b upwards, the spool 26b uncovers the inlet port 26d, allowing an increase in the hydraulic pressure within the feedback chamber 26f and the modifier pressure line 87. This increase in the hydraulic pressure in the feedback chamber 26f increases the total of the forces urging the spool 26b upwards. If the total of the forces urging the spool 26b downwards becomes less than the total of the forces urging the spool 26b upwards, the spool 26b allows communication of the outlet port 26c with the drain port 26e, causing a drop in the hydraulic pressure in the modifier pressure line 87 and in the feedback chamber 26f. This drop in the hydraulic pressure in the feed back chamber 26f decreases the total of the forces urging the spool 26b upwards. Thus, a value taken by the modifier pressure in the line 87 is proportional to a result from subtrating the force owing to the pilot pressure supplied to the port 26g from the sum of a force of the spring 26a and the force owing to the hydraulic pressure from the drain line 94. Via the modifier pressure line 87, the modifier pressure is applied to the plug 20c. It will now be understood from the preceding description that the modifier pressure is proportional to the hydraulic pressure within the drain line 74 but has a magnitude amplified by the above-mentioned subtration. The modifier pressure increases as the engine load increases during all drive ranges but the reverse (R) drive range since the hydraulic pressure within the drain line 94 increases as the engine load increases during all drive ranges but the reverse (R) drive range. During the reverse (R) drive range, the modifier pressure is the minimum value since the hydraulic pressure within the drain line 94 is 0 (zero). Since the modifier pressure of the above variation characteristic urges the plug 20c in such a direction as to compress the spring 20j, the line pressure within the fluid line 81 increases as the engine load increases during all drive ranges but the reverse (R) drive range. In order to suppress pulation in the hyraulic fluid within in modifier pressure line 87, the modifier accumulator 28 is provided.

The torque converter relief valve 32 comprises a spool 32b biased by a spring 32a to assume a spring set position as illustrated in FIG. 1A. In the illustrated position, the spool 32b allows an outlet port 32c to communicate with an inlet port 32d. As the spool 32b moves upwards, as viewed in FIG. 1A, from the illustrated position, the above-mentioned communication is decreased and then the outlet port 32c is allowed to communicate with a drain port 32e. The spool 32b is formed with an orifice bore 32g to allow a feedback of the output pressure to a feedback chamber 32f. The outlet port 32c communicates via a relief valve 95 with a front portion FR/LUB to be lubricated, and it also communicates with a lock-up control valve 34 through a fluid line 96. The inlet port 32d is connected to the port 20h of the pressure regulator valve 20 via a fluid line 97. Via the fluid line 97, the hydraulic fluid discharged by the pressure regulator valve 20 is admitted to the inlet port 32d and used as a working hydraulic fluid for the torque converter T/C.

With the torque converter relief valve 32 in the illustrated position, if hydraulic fluid is supplied to the inlet port 32d from the port 20h of the pressure regulator valve 20, it is supplied through the fluid line 96 and the lock-up control valve 34 to the torque converter T/C. Subsequently, upon build-up of pressure in the hydraulic fluid at the outlet port 32c, this pressure is transmitted via the orifice bore 32g to the feedback chamber 32f, urging the spool 32b to move upwards as viewed in FIG. 1A against the spring 32a. If the pressure exceeds a predetermined value that is determined by the force of the spring 32a, the spool 32b allows the outlet port 32c to communicate with the drain port 32e, causing a drop in the hydraulic pressure at the outlet port 32c. In this manner, the hydraulic pressure at the outlet port 32c is kept at or below the predetermined value. If the hydraulic pressure at the outlet port 32c tends to further increase beyond the above-mentioned predetermined value, the relief valve 95 opens to permit escape of excessive hydraulic fluid toward the front portion FR/LUB to be lubricated. This prevents deformation of the torque converter T/C.

The lock-up control valve 34 comprises a spool 34a, a first stepped plug 34b on one end of the spool 34a, and a second stepped plug 34c on the opposite end of the spool 34a. A spring 34d is operatively disposed between the spool 34a and the plug 34c. The spool 34a is moveable between a lock-up or lower limit position as illustrated in FIG. 1A and a lock-up release or upper limit position as viewed in FIG. 1A. When the spool 34a assumes the upper limit position, the fluid line 96 is connected to a fluid line 98 communicating with the release chamber REL of the torque converter T/C and a fluid line 99 communicating with the apply chamber APL of the torque converter T/C is connected to a drain line 100. Under this condition, the hydraulic fluid from the fluid line 96 flows into the torque converter T/C from the release chamber REL toward the apply chamber APL, rendering the torque converter T/C operable in the torque converter state thereof. The hydraulic fluid having past the torque converter T/C is admitted to the oil cooler COOL via the drain fluid line 100. The fluid is cooled down at the cooler COOL and then directed toward a rear portion RR/LUB to be lubricated. When the spool 34a assumes the lower limit position as illustrated in FIG. 1A, the fluid line 96 is connected to the fluid line 99 and the fluid line 98 is connected to a drain port 34e. Under this condition, the hydraulic fluid flows within the torque converter T/C from the apply chamber APL toward the release chamber REL, rendering the torque converter T/C operable in the lock-up state thereof. In the lock-up state, the hydraulic fluid having past through the torque converter T/C is discharged from the drain port 34e and is not directed toward the oil cooler COOL. However, the lubrication of the rear portion RR/LUB is assured by directing the hydraulic fluid from the fluid line 96 to the cooler COOL owing to the provision of orifices 101 and 102.

In order to control the position which the spool 34a assumes, a drain line 103 is connected to a chamber 34f defined between the spool 34a and the plug 34c. This drain line 103 is connected to the pilot pressure line 90 via an orifice 93, and has a drain port normally closed by a lock-up colenoid 36. The hydraulic fluid within the fluid line 98 connected to the release chamber REL acts via an orifice 104 on the stepped plug 34b, and the pilot pressure within the pilot pressure line 90 acts via an orifice 105 on the stepped plug 34b, urging the stepped plug 34b downwards, as viewed in FIG. 1A.

The lock-up solenoid 36 is turned ON (or energized) or OFF (deenergized) under the control of the computer. It is judged by the computer whether an operating condition in which the vehicle is involved demands that the torque converter T/C operate in the lock-up state or not. If it is not demanded that the torque converter T/C should operate in the lock-up state, the lock-up solenoid 36 is turned OFF to close the drain port of the drain line 103, allowing the pilot pressure to build up in the drain line 103. This pilot pressure is supplied to the chamber 34f to assist the action of the spring 34d and urges the spool 34a to move against the hydraulic pressures acting on the plug 34b toward the upper limit position as viewed in FIG. 1A. With the spool 34a in the upper limit position, the torque converter T/C is rendered to assume the converter state thereof. When it is judged that the torque converter T/C should lock up, the lock-up solenoid 36 is turned ON or energized, opening the drain port of the drain line 103. No pressure prevails in the drain line 103. This allows the spool 34a to assume the lower limit position as illustrated in FIG. 1A since the pilot pressure acting via the orifice on the stepped piston 34b urges the stepped plug 34b and the spool 34 downwards against the spring 34d, rendering the torque converter T/C to be operable in the lock-up state.

In the present embodiment, the torque converter T/C is prevented from being operable in the lock-up state thereof during forward running with the first gear position or during reverse running. In order to accomplish this object, the chamber 34g which the plug 34c is exposed to is connected via a fluid line 106 to an outlet port of a shuttle valve 107 which has two inlet ports connected to the reverse-select fluid line 88 and a first-select fluid line 108. When a hydraulic pressure prevails in one of the fluid lines 88 and 108, this hydraulic pressure is transmitted via the shuttle valve 107 to the fluid line 106 and thus to the chamber 34g, urging the plug 34c and spool 34a upwards, viewing in FIG. 1A, for movement toward the upper limit position thereof, causing the torque converter T/C to be operable in the converter state thereof. The pilot pressure coming from the orifice 105 always acts on the stepped plug 34b downwards, thus preventing pulsation of the stepped plug 34b, the spool 34a, and the stepped plug 34a.

The manual valve 38 comprises a spool 38a manually operable by a driver to move among a park (P) position, a reverse (R) position, a neutral (N) position, a forward automatic, drive (D) range position, a three (III) range engine braking position, a two (II) range engine braking position. The manual valve 38 is formed with an inlet port connected to the line pressure fluid line 81, a drain port, and outlet ports 38R, 38D, 38III, and 38II. The following TABLE shows which one or ones of the outlet ports are allowed to communicate with the inlet port connected to the line pressure fluid line 81 in accordance with the various positions which the spool 38a is placed at.

| PORT | 38R | 38D | 38III | 38II |
|------|-----|-----|-------|------|
| P    |     |     |       |      |
| R    | o   |     |       |      |
| N    |     |     |       |      |
| D    |     | o   |       |      |
| III  |     | o   | o     |      |
| II   |     | o   | o     | o    |

The port 38D is connected to a D range pressure fluid line 110 which is connected to the accumulator control valve 30, the forward clutch F/C, the accumulator shift valve 58, the first shift valve 42, the second shift valve 44, and the overrunning clutch control valve 62. The port 38III is connected to a III-range pressure fluid line 111 which is connected to the other inlet port of the shuttle valve 112. The port 38II is connected to a II-range pressure fluid line 113 which is connected to the II range pressure reduction valve 72. The port 38R is connected to the reverse-select pressure fluid line 88. The fluid line 88 is connected to the pressure regulator valve 20 and also to one inlet port of the shuttle valve 107 to perform the before mentioned boost-up function of the line pressure and the lock-up prohibiting function. Besides, the fluid line 88 is connected via an one-way orifice 114 and a shuttle valve 115 to the low reverse brake LR/B, and it is also connected via an one-way orifice 117 to the reverse clutch R/C.

The accumulator control valve 30 comprises a spool 30a with two lands having different diameters. A lower one of these two lands, as viewed in FIG. 1A has a larger diameter than the other upper land and thus define therebetween a differential pressure acting area. The land with the larger diameter is exposed to a chamber 30b which communicates with the fluid line 94, while the land with the less diameter is exposed to a draining chamber 30c. The spool 30a is urged upwards, as viewed in FIG. 1A, in response to the hydraulic pressure prevailing in the fluid line 94. As before discussed, the hydraulic pressure in the fluid line 94 is adjustable under the control of the duty solenoid 24. When the spool 30a has moved upwards viewing in FIG. 1A and the outlet port 30d is isolated from a drain port 30e and connected to the D-range pressure fluid line 110, an accumulator back-up pressure prevails at a port 30d. This pressure is applied to the differential pressure acting area defined between the two different diameter lands of the spool 30a, urging the spool 30a downwards, as viewed in FIG. 1A, against the fluid pressure supplied to the chamber 30b. The spool 30a strokes until the accumulator back-up pressure balances with the pressure within the chamber 30b. Thus the accumulator back-up pressure at the port 30d is variable in response to the pressure within the chamber 30b. Since the hydraulic pressure within the chamber 30b is variable with the engine load during all drive ranges but the reverse drive range owing to the control by the duty solenoid 24, and the pressure within the D-range pressure line 110 prevails during forward drive ranges only, the accumulator back-up pressure prevails during forward drive ranges, only, and increases as the engine load increases. Thus, the accumulator back-up pressure is engine load responsive. The accumulator back-up pressure is supplied via an accumulator back-up pressure fluid line 116 to the 1-2 accumulator valve 52, N-D accumulator 54, accumulator 60, direct clutch accumulator 70, and overrunning clutch pressure reduction valve 64.

Disposed in that portion of the D-range pressure fluid line which allows supply of hydraulic fluid to the forward clutch F/C is a one-way orifice 120. Via a one-way coupling 121, the N-D accumulator 54 and the accumulator shift valve 58 are fluidly connected in series in this order to that portion of the D-range pressure fluid line 110 which extends between the one-way orifice 120 and the forward clutch F/C.

The first shift valve 42 comprises a spool 42b biased by a spring 42a to assume a first or spring set position as illustrated in FIG. 1A. This spool 42b is urged to move upwards when the pilot pressure within the fluid line 90 is supplied to a chamber 42c when the first shift solenoid A is turned ON to close the associated drain port. When the spool 42b is in the spring set position as illustrated in FIG. 1A, the D-range pressure line 110 is allowed to communicate with the second gear pressure fluid line 122, the first gear-select pressure fluid line 108 is allowed to communicate with a drain port 42d, a II-range pressure fluid line 124 is allowed to communicate with a drain port 42f, and fluid lines 125 and 126 are allowed to communicate with each other. When the spool 42b is urged to move to a second or upper position as viewed in FIG. 1A, the first gear-select pressure fluid line 108 is isolated from the drain port 42d and allowed to communicate with a fluid line 127, the fluid line 122 is isolated from the fluid line 110 and allowed to communicate with a fluid line 128, the fluid line 122 is isolated from the D-range pressure line 110 and allowed to communicate with a fluid line 128, the fluid line 124 is isolated from the drain port 42f and allowed to communicate with a fluid line 129, and the fluid line 126 is isolated from the fluid line 125 and allowed to communicate with the fluid line 128.

The fluid line 122 extends via a check valve 130 to the servo apply chamber 2S/A of the band brake B/B. The fluid line 124 is connected to the corresponding inlet of the shuttle valve 115. The fluid line 125 is connected to the 5-2 relay valve 48 and also to the overrunning clutch control valve 62. The fluid line 127 is connected on one hand to the 5-2 sequence valve 50 and on the other hand to the second shift valve 44. The fluid line 128 extends via one way orifices 131 and 132 to the high clutch H/C and it extends also to the second shift valve 44. The fluid line 129 is connected to the second shift valve 44.

The second gear pressure line 122 is provided with a one-way check valve 130. A bypass circuit 133 is connected to the fluid line 122 in parallel to the one-way check valve 130. The 1-2 accumulator valve 52 is disposed in this bypass circuit 133. The 1-2 accumulator valve 52 comprises a spool 52a with a small diameter end and a large diameter end, a spring 52b acting on the large diameter end of the spool 52a, and a spring 52c acting on the small diameter end of the spool 52a. The spool 52a is formed with a shoulder 52d serving as a pressure acting area. Acting on this pressure acting area is the accumulator back-up pressure. The spool 52a is urged downwards as viewed in FIG. 1A owing to the accumulator back-up pressure acting on the shoulder 52d and a difference in forces with which the springs 52b and 52c bias the spool 52a. The spool 52a initially assumes a position downwards from an equilibrium position as illustrated in FIG. 1A. When the spool 52a is in this initially assuming position, an outlet port 52e is allowed to communicate with an inlet port 52f, permitting the hydraulic fluid to bypass the one-way check valve 130 to cause a hydraulic pressure to act within the servo apply chamber 2S/A. This hydraulic pressure is transmitted via an orifice 134 to a feedback chamber 52g, pushing back the spool 52a upwards as viewed in FIG. 1A. When the hydraulic pressure supplied to the chamber 52g exceeds a predetermined value determined in response to the force derived from the accumulator back-up pressure acting on the shoulder 52d and the difference in forces with which the springs 52b and 52c bias the spool 52a, the spool 52a allows the outlet port 52e to communicate with a drain port 52h, discharging a portion of the hydraulic fluid to cause a drop in the hydraulic pressure. Thus, this hydraulic pressure is adjusted to the above mentioned predetermined value.

The hydraulic pressure appearing at the outlet port 52e and acting within the servo apply chamber 2S/A is transmitted via an orifice 136, owing to the provision of a coupling 135 designed to prevent a flow of hydraulic fluid bypassing this orifice 136, to a piston cap 52i which the spring 52c acts on. Thus, the piston cap 52i moves downwards, as viewed in FIG. 1A, against the spring 52c, causing a gradual increase in the force which the spring 52c acts on the spool 52a. This causes the hydraulic pressure acting within the servo apply chamber 2S/A to increase at a predetermined rate with respect to time. Since the accumulator back-up pressure acting on the shoulder 52d of the spool 52a increases with an increase in engine load, a level assumed by the hydraulic pressure acting within the second gear servo apply chamber 2S/A during a period when it increases at the above-mentioned predetermined rate increases with an increase in engine load.

The second shift valve 44 comprises a spring 44a and a spool 44b biased by the spring 44a to assume a first or spring set position as illustrated in FIG. 1B. The spool 44b is exposed to a chamber 44c. When the pilot pressure is supplied to this chamber 44c with the second shift solenoid B being turned ON to close the associated drain port, the spool 44b is urged to move against the spring 44a upwards, as viewed in FIG. 1B, from the illustrated spring set position. When the spool 44b assumes the illustrated position, the fluid line 127 is allowed to communicate with a drain port 44d, and the fluid line 110 is allowed to communicate with the fluid line 128, while when the spool 44b moves upwards to a second or upper position owing to the supply of the pilot pressure to the chamber 44c, the fluid line 110 is allowed to communicate with the fluid line 127, the fluid line 128 is allowed to communicate with a drain port 44e, and the fluid line 129 is allowed to communicate with a fluid line 140 which is connected to the 1 & II range pressure reduction valve 72.

The 5-2 relay valve 48 comprises a spring 48a, and a spool 48b biased by the spring 48a to assume a first or spring set position as illustrated in FIG. 1B, The spool 48b is moveable in response to the hydraulic pressure within the fluid line 126 and urged against the spring 48a for upward movement, as viewed in FIG. 1B, from the illustrated position to a second or upper position.

When the spool 48b is in the illustrated position, the fluid line 125 is allowed to communicate with a drain port 48c, while when it is in the upper position thereof, the fluid line 125 is isolated from the drain port 48c and allowed to communicate with a fluid line 141 which is connected to the 5-2 sequence valve 50.

The 5-2 sequence valve 50 comprises a spring 50a, and a spool 50b biased by the spring 50a to assume a first or spring set position as illustrated in FIG. 1A. The spool 50b is moveable in response to hydraulic pressure within a fluid line 142. When the hydraulic pressure prevails in the fluid line 142, the spool 50b is urged against the spring 50a for downward movement, as viewed in FIG. 1A, from the illustrated position to a second or lower position. When the spool 50b is in the illustrated position, the fluid line 141 is allowed to communicate with a drain port 50c, while when it is in the lower position thereof, the fluid line 141 is isolated from the drain port 50c and allowed to communicate with the fluid line 127.

The fluid line 142 is connected to a fluid line 144 which interconnects the servo release chamber 3,4S/R of the band brake B/B and the high clutch H/C. An one-way orifice 143 is disposed in that portion of the fluid line 144 which extends between the high clutch H/C and a junction at which the fluid line 142 is connected to the fluid line 144. Connected to the fluid line 142 is a fluid line 147 having an one-way orifice and a one-way coupling 146. The fluid line 147 is connected to the accumulator shift valve 58. Also connected to this accumulator shift valve 58 are a fluid line 148 that is connected to the accumulator 56 and a fluid line 149 connected to the reverse clutch R/C.

The accumulator shift valve 58 comprises a spring 58a and a spool 58b biased by the spring 58a to assume a first or spring set position as illustrated in FIG. 1B. The spool 58b is moveable in response to hydraulic pressure within the D-range fluid line 110. When the hydraulic pressure exists in the D-range fluid line 110, the spool 58b is urged against the spring 58a for leftward movement, as viewed in FIG. 1B, to a second or leftward position. When the spool 58b is in the illustrated position, the fluid line 148 is allowed to communicate with the fluid line 149 to put the accumulator 56 in use for controlling pressure rise in the reverse clutch R/C. When the spool 58b assumes the leftward position owing to the presence of the hydraulic pressure within the D-range fluid line 110, the fluid line 148 is isolated from the fluid line 149 and allowed to communicate with the fluid line 149, putting the accumulator 56 in use for controlling pressure rise in the servo release chamber 3,4S/R of the band brake B/B.

Connected to the servo apply chamber 5S/A of ther band brake B/B is a fluid line 150. The fluid line 150 extends to an overrunning clutch control valve 62. The accumulator 60 and an one way orifice 151 are arranged in the fluid line 150 between the servo apply chamber 5S/A and the overrunning clutch control valve 62. The overrunning clutch control valve 62 comprises a spring 62a, and a spool 62b biased by the spring 62a to assume a first or spring set position as illustrated in FIG. 1B. In response to supply of hydraulic pressure to a chamber 62c, the spool 62b is urged against the spring 62a for upward movement, as viewed in FIG. 1B, from the illustrated position to a second or upper position. When the overrunning solenoid 40 is turned ON to close the associated drain port, the pilot pressure 90 prevailing in the fluid line 90 is delivered to the chamber 62c. When the overrunning clutch solenoid 40 is turned OFF, the hydraulic fluid is discharged from the chamber 62c. When the spool 62b is in the illustrated position, a fluid line 152 is allowed to communicate with the D-range fluid line 110 and the fluid line 150 is allowed to communicate with a drain port 62d. When the spool 62b assumes the upper position thereof, the fluid line 152 is isolated from the D-range fluid line 110 and allowed to communicate with the drain port 62d, and the fluid line 150 is isolated from the drain port 62d and allowed to communicate with the fluid line 126.

The third shift valve 46 comprises a spring 46a, and a spool 46b biased by the spring 46a to assume a first or spring set position as illustrated in FIG. 1B. The spool 46b has one end exposed to a chamber 46c which is supplied with the pilot pressure from the fluid line 90 and an opposite end exposed to a chamber 46d adapted to be subject to hydraulic fluid pressure within a fluid line 153. The fluid line 153 is connected to an outlet port of the shuttle valve 154 which has two inlet ports, one being supplied with the pilot pressure prevailing in the fluid line 90 when the third shift solenoid C is turned ON to close the associated drain port, the other being supplied with a reverse range pressure prevailing in the reverse-select fluid line 155. When one of these two pressures appears, it is delivered via the shuttle valve 154 and the fluid line 153 to the chamber 46d, urging the spool 46b upwards (viewing in FIG. 1B) in assisting the action of the spring 46a to keep the spool 46b in the illustrated position against the pilot pressure within the chamber 46c. When no pressure is delivered to the chamber 46d, the spool 46b is urged by the pilot pressure delivered to the chamber 46c for downward movement, as viewed in FIG. 1B, against the action of the spring 46a. When the spool 46b is in the illustrated position, a fluid line 156 is allowed to communicate with a drain port 46e, and a fluid line 157 is allowed to communicate with the line pressure fluid line 81. When the spool 46b moves downwards to assume a second or lower position, the fluid line 156 is isolated from the drain port 46e and allowed to communicate with the line pressure fluid line 81, and the fluid line 157 is isolated from the line pressure fluid line 81 and allowed to communicate with a drain port 46f.

The fluid line 156 is connected to the direct clutch D/C. A one-way orifice 158 is fluidly disposed in the fluid line 156 between the 5-2 relay valve 48 and the direct clutch D/C. Via a one-way orifice 159, a direct clutch accumulator 70 is fluidly connected to the fluid line 156 at a portion between the one-way orifice 158 and the direct clutch D/C. The fluid line 157 is connected to the reduction brake RD/B and has a one-way orifice 160 disposed between the third shift valve 46 and the reduction brake RD/B. The reduction brake accumulator 68 is connected to the fluid line 157 at a portion between the one-way orifice 160 and the reduction brake RD/B.

This accumulator 68 has the fluid line 161 communicating with a back-up pressure chamber thereof. The fluid line 161 extends from the accumulator 68 and is connected to an outlet port of a shuttle valve 112. This shuttle valve 112 has two inlet ports, one being connected to the III-range pressure fluid line 111 to receive the III-range pressure, the other being connected to a fluid line 155 connected to the reverse-select pressure fluid line 88 to receive the reverse-select pressure.

The fluid line 161 extends also to the reduction timing valve 66 and communicating with a chamber 66a to supply the fluid pressure therein to the chamber 66a. This reduction timing valve 66 comprises a spool 66b biased by a spring 66c to assume a first or spring set position as illustrated in FIG. 1B. When the hydraulic pressure is present in the chamber 66a, the spool 66b is urged against the spring 66c for upward movement, as viewed in FIG. 1B, from the illustrated position to a second or upper position thereof. When the spool 66b is in the illustrated position, a bypass line 163 arranged in parallel to the one-way orifice 160 is closed. The bypass line 163 has one end connected the fluid line 157 at a portion between the reduction brake RD/B and the accumulator 68 and an opposite end connected to the reduction timing valve 66. Thus, when the spool 66a assumes the illustrated position, the opposite end of the branch line 163 is closed and disconnected from the fluid line 157 at a portion between the one-way orifice 160 and the third shift valve 46. An orifice 162 is disposed in the bypass line 163. When the spool 66b takes the upper position thereof, the opposite end of the fluid line 163 is connected to the fluid line 157 at the portion between the one-way orifice 160 and the third shift valve 46, thus opening the bypass line 163.

The overrunning clutch reduction valve 64 has a function to reduce the hydraulic pressure supplied thereto from the fluid line 152. The reduced pressure generated by the overrunning clutch reduction valve 152 is supplied to the overrunning clutch OR/C. This reduction valve 64 comprises a spring 64a and a spool 64b biased by the spring 64a. The spool 64b has a pressure acting area exposed to the accumulator backup pressure from the fluid line 116. The accumulator backup pressure acting on the spool 64b induces a force urging the spool 64b upwards, as viewed in FIG. 1B, assisting the action of the spring 64a. Thus, the spool 64b assumes a first or spring set position as illustrated in FIG. 1B when no hydraulic pressure exists in the fluid line 152. When the spool 64b is in the illustrated position, an outlet port 64c is allowed to communicate with the fluid line 152, allowing supply of hydraulic pressure from this outlet port 64c to the overrunning clutch OR/C. A fluid line 165 with an orifice 164 interconnects this outlet port 64c and the overrunning clutch OR/C. The hydraulic pressure supplied to the overrunning clutch OR/C is fed to a feed-back chamber 64e through an orifice passage 64d which the spool 64b is formed with. As the hydraulic pressure supplied to the overrunning clutch OR/C increases, the spool 64b is urged for downward movement from the illustrated position since the spool 64b has an upper end, as viewed in FIG. 1B, exposed to the feed-back chamber 64e. When this pressure exceeds a predetermined value that is determined by the sum of a force with which the accumulator back-up pressure urges the spool 64b and a force with which the spring 64a biases the spool 64b, the spool 64b assumes a position where it allows the outlet port 64c to communicate with a drain port 64f, causing a drop in the hydraulic pressure. As a result, the hydraulic pressure supplied to the overrunning clutch OR/C becomes equal to the predetermined value. However, since the accumulator back-up pressure increases as the engine load increases, this predetermined value also increases as the engine load increases. Thus, the hydraulic pressure supplied to the overrunning clutch OR/C increases as the engine load increases. As a result, a transient capacity of the overrunning clutch OR/C during engagement thereof is variable with variation in the engine load. A fluid line 167 with a one-way valve 166 is arranged in parallel to the orifice 164 and has one end communicating with the fluid line 152 and an opposite end connected to the fluid line 165. The one-way valve 166 and the orifice 164 cooperate with each other to form an one-way orifice.

The II-range pressure reduction valve 72 has a function to effect a pressure reduction of the hydraulic pressure supplied thereto from the II-range fluid line 113 and delivers the reduced pressure to the fluid line 140. The reduction valve 72 comprises a spring 72a and a spool 72b biased by the spring 72a to assume a spring set position as illustrated in FIG. 1B. When the spool 72b is in this illustrated position, the fluid line 113 is allowed to communicate with the fluid line 140, inducing a hydraulic pressure within the fluid line 140. This hydraulic pressure acts via an orifice passage 72 on the righthand end of the spool 72b, urging the spool 72b for leftward movement, as viewed in FIG. 1B, against the action of the spring 72a. When the hydraulic fluid pressure acting on the righthand end of the spool 72b exceeds a predetermined value that is determined by the force of the spring 72a, the fluid line 140 is allowed to communicate with a drain port 72d, allowing drainage of a portion of hydraulic fluid, causing a drop in the hydraulic pressure. As a result, the hydraulic fluid pressure within the fluid line 140 becomes equal to the predetermined value.

The operation of the hydraulic control system shown in FIGS. 1A and 1B is described.

Before entering the description, the states which the shift solenoids A, B, and C should take for each of the five forward speeds or gear positions can be tabulated as follows:

| GEAR | SHIFT SOL. | | |
|---|---|---|---|
| | A | B | C |
| FIRST | ON | ON | ON |
| SECOND | OFF | ON | ON |
| THIRD | OFF | OFF | ON |
| FOURTH | OFF | OFF | OFF |
| FIFTH | ON | OFF | OFF |

P or N

When a driver places the manual valve 38 to P position or N position while the vehicle is at a standtill, all of the ports 38D, 38III, 38II, and 38R are allowed to communicate with a drainage and thus serve as drain ports, respectively. Thus, the fluid line 81 is not supplied to the forward clutch F/C, high clutch H/C, band brake B/B, reverse clutch R/C, low & reverse brake LR/B, and overrunning clutch OR/C are held deactivated. As a result, the main gearing 3 is conditioned in neutral.

Under this condition, the auxiliary gearing 4 is held in the low gear position thereof for simplification of the valve assembly. The third shift solenoid C is turned ON when the manual valve 38 is placed at P or N position, the pilot pressure prevails in the fluid line 153 and thus reaches the chamber 46d of the third shift valve 46. Thus, the third shift valve 46 assumes the illustrated position wherein the fluid line 156 is allowed to communicate with the drain port 46e and the fluid line 157 is allowed to communicate with the line pressure fluid line 81. As a result, the direct clutch D/C is drained via the fluid line 156, and the reduction brake RD/B is engaged with the line pressure supplied thereto through the fluid line 157, conditioning the auxiliary gearing 4 in the low gear position.

D Range

When the manual valve 38 is placed at D position, an automatic shift among the five gear positions is effected.

First Gear

With the manual valve 38 placed at D position, the port 38D only is allowed to communicate with the line pressure fluid line 81, allowing the line pressure to prevail in the fluid line 110 and to serve as a so-called D range pressure. Immediately after the manual valve 38 has been shifted from P or R position to D position, the hydraulic fluid flows through the fluid line 110 toward the forward clutch F/C. Since this flow hydraulic fluid is restricted by the one-way orifice 120 and influenced by the N-D accumulator 54, the forward clutch F/C is engaged without any substantial shock.

When the manual valve 38 is shifted from P or N position to D position while the vehicle is at a standstill, the third shift solenoid C is kept turned ON, and the first and second shift solenoid A and B are turned ON under the control of the computer. With the first and second shift solenoids A and B turned ON, the spools 42b and 44b of the first and second shift valves 42 and 44 are shifted to their upper positions, respectively. With the spool 44b of the second shift valve 44 in the upper position thereof, the fluid line 128 extending to the high clutch H/C is allowed to communicate with the drain port 44e. Since the fluid line 128 is drained, the high clutch H/C is held disengaged or released. Since it is connected to the fluid line 128, the fluid line 144 is also drained. Thus, the servo release chamber 3,4S/R for the band brake B/B is drained. The servo apply chamber 2S/A for the band brake B/B is depressurized since the fluid line 122 is allowed by the first shift valve 42 to communicate with the fluid line 128 which is drained under this condition. The other servo apply chamber 5S/A for the band brake B/B is depressurized since the fluid line 150 is drained in the following manner. Unless the driver manipulates to command an engine braking, the computer keeps the overrunning clutch solenoid 40 turned ON, so that the pilot pressure is supplied to the overrunning clutch control valve 62 to hold the spool 62b thereof in the upper position. This causes the fluid line 152 to communicate with the drain port 62d, releasing the overrunning clutch OR/C. This also causes the fluid line 150 to communicate with the fluid line 126. Since this fluid line 126 is allowed by the first shift valve 42 to communicate with the fluid line 128 that is drained via the drain port 44e owing to the second shift valve 44. Thus, the fluid line 150 is drained and the servo apply chamber 5S/A is also drained. The reverse clutch R/C and the low & reverse brake LR/B are both released since the fluid line 88 is drained via the drain port 38R of the manual valve 38.

Since the reduction gear is established in the auxiliary gearing 3, the forward clutch F/C only is engaged and the forward one-way clutch F/OWC is active, the overall automatic transmission is conditioned in the first gear position thereof. Under this condition, the torque converter T/C is held in the converter state. Owing to the positions taken by the first and second shift valves 42 and 44, the fluid line 108 communicates with the fluid line 127 which in turn communicates with the D-range fluid line 110, so that the line pressure in the D-range fluid line 110 is delivered through the fluid lines 127 and 108, shuttle valve 107, and the fluid line 106 to the lock-up control valve 34. This causes the plug 34c to hold the spool 34a in the upper position thereof whereby the torque converter T/C is conditioned in the converter state. Accordingly, the engine is able to keep running without engine stall with the overall automatic transmission being conditioned in the first gear position and serves as a brake holding the vehicle at a standstill.

Shock upon engagement of the forward clutch F/C is alleviated owing to the one-way orifice 120 and N-D accumulator 54. Thus, this arrangement alleviates a so-called N-D select shock taking place upon shifting the manual valve 38 from N or P position to D position.

With the automatic transmission conditioned in the first gear position or first speed, the vehicle starts moving forward when the driver depresses the accelerator pedal.

Second Gear

When the vehicle increases its speed and enters an operating condition which demands that the automatic transmission be conditioned in the second gear position, the computer turns the first shift solenoid A OFF, causing the first shift valve 42 to take the spring set position as illustrated in FIG. 1A, isolating the fluid line 126 from the fluid line 128 and allowing the fluid line 126 to communicate with the fluid line 125. This fluid line 125 is allowed to communicate with the drain port 48c owing to the 5-2 relay valve 48. Thus, the fluid line 126 is kept drained, leaving the servo apply chamber 5S/A for the band brake B/B drained. When the first shift valve 42 is in the spring set position as illustrated in FIG. 1A, the fluid line 108 is isolated from the fluid line 127 and now allowed to communicate with the drain port 42d, draining the fluid line 106 and in turn the chamber 34g of the lock-up control valve 34. Thus, the plug 34c takes the position as illustrated in FIG. 1A and no longer holds the spool 34a in the position whereby the torque converter T/C maintains the converter state. Under this condition, the lock-up solenoid 36, under the control of the computer, causes the spool 34a of the lock-up control valve 34 to shift between the position as illustrated in FIG. 1A whereby the torque converter T/C is conditioned in the lock-up state and the other position whereby the torque converter T/C is conditioned in the converter state.

With the first shift valve 42 in the illustrated position, the fluid line 122 is isolated from the fluid line 128 and allowed to communicate with the D-range pressure fluid line 110, allowing the line pressure to be supplied to the fluid line 122 as an servo activating pressure for the servo apply chamber 2S/A. Owing to the beforementioned function of the 1-2 accumulator valve 52, a change, with respect to time, in the hydraulic pressure prevailing in that portion of the fluid line 122 which extends between the first shift valve 42 and the one-way valve 130 is modulated and then transmitted to the servo apply chamber 2S/A. Thus, the band brake B/B is engaged or applied without any substantial shock, namely, a 1-2 shift shock. With the forward clutch F/C, forward one-way clutch F/OWC, and reduction brake RD/B held activated, engagement of the band brake B/B causes the automatic transmission to upshift from the first gear position to the second gear position.

Third Gear

When the vehicle enters an operating condition which demands that the third gear be established in the automatic transmission, the computer turns the second shift solenoid B OFF, allowing the second shift valve 44 to shift to the position as illustrated in FIG. 1B. With the second shift valve 44 in the illustrated position, the fluid line 128 is isolated from the drain port 44e and allowed to communicate with the D-range pressure fluid line 110. Thus, the line pressure in the fluid line 110 is transmitted via the one-way orifice to the high clutch H/C, causing the high clutch H/C to be engaged. The hydraulic pressure acting on the high clutch H/C is transmitted to the servo release chamber 3,4S/R through the fluid line 144 communicating with that portion of the fluid line 128 which extends between the one-way orifice 132 and the high clutch H/C. Thus, the band brake B/B is released owing to pressurization of the servo release chamber 3,4S/R. The accumulator shift valve 58 has its spool 58b moved leftwards against the spring 58a owing to the D-range pressure applied to the righthand end of the spool 58b viewing in FIG. 1B. This causes the fluid line 147 to communicate with the fluid line 148 which in turn communicates with the accumulator 56. Thus, the hydraulic fluid to be supplied to the servo release chamber 3,4S/R is also supplied, via the one-way orifice 145, one-way coupling 147, fluid line 147 and fluid line 148, to the accumulator 56. This causes the piston of the accumulator 56 to stroke from a position as illustrated by the righthand half thereof viewing in FIG. 1B to a position as illustrated by the lefthand half thereof viewing in FIG. 1B. During this stroke of the accumulator piston, the hydraulic pressure supplied to the servo release chamber 3,4S/R gradually increases. As a result, the band brake B/B is released in good timed relationship with engagement of the high clutch H/C.

With the forward clutch F/C, forward one-way clutch F/OWC and reduction brake RD/B held activated, releasing the band brake B/B in good timed relationship with engagement of the high clutch H/C causes the automatic transmission to upshift from the second gear position to the third gear position. Owing to the accumulator 56, a shift shock taking place during this upshift is suppressed.

Fourth Gear

When the vehicle enters an operating condition which demands the fourth gear be established in the automatic transmission, the computer turns the third shift solenoid C OFF with the first and second shift solenoids A and B held OFF. Deenergization of the third shift solenoid C causes the spool 46b of the third shift valve 46 to move downwards from the illustrated position as viewed in FIG. 1B toward the lower position. When the spool 46b of the third shift valve 46 takes the lower position, the fluid line 157 is isolated from the line pressure fluid line 81 and allowed to communicate with the drain port 46f, while the fluid line 156 is isolated from the drain port 46e and allowed to communicate with the line pressure fluid line 81. This causes the reduction brake RD/B to be released by draining the fluid line 157 and the direct clutch D/C to be engaged by pressurizing the fluid line 156. As a result, the auxiliary gearing 4 shifts from the low gear position thereof to the high or direct drive position thereof, causing the automatic transmission to upshift from the third gear position to the fourth gear position.

During this upshift operation, the servo activating hydraulic pressure supplied to the direct clutch D/C gradually increases owing to the one-way orifice 158 and to stroke of the piston of the direct clutch accumulator 70 from a position as illustrated by the right half thereof to a position as illustrated by the left half thereof as viewed in FIG. 1B. In this manner, a so-called 3-4 shift shock induced by engagement shock of the direct clutch D/C is alleviated.

Fifth Gear

When the vehicle enters an operating condition which demands the fifth gear be established in the automatic transmission, the computer turns the first shift solenoid A ON, causing the spool 42b of the first shift valve 42 to move upwards as viewed in FIG. 1A. When the spool 42b of the first shift valve 42 assumes the upper position thereof, the fluid line 128 which is allowed to communicate with the D-range pressure line 110 by the second shift valve 44 is allowed to communicate with the fluid line 126, allowing the D-range pressure to be supplied to the fluid line 126. This hydraulic pressure is supplied via the overrunning clutch control valve 62 and fluid line 150 to the servo apply chamber 5S/A. As a result, the band brake B/B is applied. Owing to the above-mentioned shift of the first shift valve 42, the fluid line 122 is isolated from the D-range pressure fluid line 110 and allowed to communicate with the fluid line 128. Since the D-range fluid pressure is kept supplied via the fluid line 128 to the fluid line 122, the servo apply chamber 2S/A is kept pressurized.

With the forward clutch F/C, high clutch H/C and direct clutch D/C being kept engaged, engagement of the band brake B/B in the previously described manner causes the automatic transmission to upshift from the fourth gear position to the fifth gear position (overdrive).

During this upshift operation, the flow of hydraulic fluid toward the servo apply chamber 5S/A is restricted by the one-way orifice 151, and the piston of the accumulator 60 strokes from a position as illustrated by the righthand half thereof to a position as illustrated by the lefthand half thereof as viewed in FIG. 1B. As a result, the band brake B/B is engaged without any substantial shock and a so-called 4-5 shock is alleviated.

When the spool 42b of the first shift valve 42 shifts from the illustrated position to the upper position thereof, the fluid line 108 is isolated from the drain port 42d and allowed to communicate with the fluid line 127. Since this fluid line 127 still communicates with the drain port 44d when the second shift valve 44 is in the illustrated position, no hydraulic fluid pressure is supplied to the chamber 34g of the lock-up control valve 34, leaving the lock-up control valve 34 under the control of the solenoid 36.

OD Inhibiting

When the driver closes the overdrive inhibiting switch by pressing a button thereof, the computer will not select such an ON-OFF combination of the shift solenoids A and B which causes the automatic transmission to assume the fifth gear position. Thus, the automatic transmission is shiftable between the first, second, third and fourth gear positions. Under this condition, the computer turns off the overrunning clutch solenoid 40 when the throttle opening degree becomes smaller than a predetermined value, i.e., 1/16 of the fully opened throttle opening degree. This causes the overrunning clutch control valve 62 to shift to the position as illustrated in FIG. 1B. When the overrunning clutch control valve 62 takes the illustrated position as viewed in FIG. 1B, the fluid line 152 is allowed to communicate with the D-range fluid line 110. Thus, the D-range pressure is supplied to the fluid line 152 and then to the overrunning clutch reduction valve 64 where it is subject to pressure regulation to generate a reduced pressure. This reduced pressure is supplied to the overrunning clutch OR/C to engage same. This engagement of the overrunning clutch OR/C causes the automatic transmission to establish engine brake running status with the second gear position, third gear position and fourth gear position. Since the overrunning clutch OR/C is engaged with the reduced hydraulic pressure owing to the reduction valve 64, a shock taking place upon engagement of the overrunning clutch OR/C is alleviated.

When the overrunning clutch control valve 62 shifts in the above-mentioned manner, the fluid line 150 is allowed to communicate with the drain port 62d, draining the servo apply chamber 5S/A, thus releasing the band brake B/B. Thus, the band brake B/B is released when the overrunning clutch OR/C is engaged, preventing the transmission from interlocking owing to engagement of the overrunning clutch OR/C upon engagement of the band brake B/B.

4-3 Downshift

Description is made as to a shift in the auxiliary gearing 4 from the high gear position (direct drive) to the low gear position in effecting a 4-3 downshift.

In effecting the 4-3 downshift, the computer holds the main gearing 3 in the fourth gear position thereof and shifts the third shift solenoid C from the OFF state to the ON state, rendering the third shift valve 46 to assume the position as illustrated in FIG. 1B. As a result, the fluid line 156 is allowed to communicate with the drain port 46e and thus drained, allowing the release of the direct clutch D/C. At the same time, the fluid line 157 is allowed to communicate with the line pressure fluid line 81, allowing the line pressure to be supplied to the reduction brake RD/B in the following manner.

During this 4-3 downshift in the D-range, no pressure is supplied to the chamber 66a of the reduction timing valve 66 and the back-up pressure chamber of the reduction brake accumulator 68 since fluid line 161 is drained. This is because the manual valve 38 has the ports 38III and 38R drained, thus draining the fluid lines 111 and 88. As a result, the reduction timing valve 66 assumes the illustrated position where the bypass line 163 is closed and the hydraulic fluid is supplied to the reduction brake RD/B only through the one-way orifice 160. Besides, the back-up pressure of the reduction accumulator 68 is zero, so that the accumulator 68 exhibits a pressure modulating characteristic determined by the spring 68a.

Referring to FIG. 3, the fully drawn line $P_D$ shows how the hydraulic pressure supplied to the reduction brake RD/B varies during the 4-3 downshift with the manual valve 38 in D position. Initially, the piston 68b of the accumulator 68 assumes the position as illustrated by the right half thereof viewing in FIG. 1B and thus the hydraulic pressure supplied to the reduction brake RD/B jumps to a value $P_1$ determined by the force of spring 68a. Subsequently, the piston 68b of the accumulator 68 moves from the position as illustrated by the right half thereof viewing in FIG. 1B to the position as illustrated by the left half thereof viewing in FIG. 1B against the force of the spring 68a. During this phase, the hydraulic pressure supplied to the reduction brake RD/B increases at a rate, with respect to time, determined by the internal diameter of the one-way orifice 160. At a moment $t_1$ prior to the termination of this movement of the piston 68b of the accumulator 68, the hydraulic pressure supplied to the reduction brake RD/B jumps to a value determined by the force of the return spring (not shown) of the reduction brake RD/B. Then, the reduction brake RD/B is subject to a so-called "lost stroke". At a moment $t_2$ when this "lost stroke" terminates, the hydraulic pressure supplied to the reduction brake RO/B jumps to a level as high as the line pressure $P_L$.

A pressure value required for engagement of the reduction brake RD/B is $P_2$ and the reduction brake RD/B is engaged at a moment $t_2$ when the hydraulic pressure increases upto this value $P_2$. Since engine braking is not required during D-range and engine torque is transmitted from the transmission input shaft to the transmission output shaft, the reduction one-way clutch RD/OWC (see FIG. 2) serves as a reaction element during the release of the direct clutch D/C. Thus, the delayed engagement of the reduction brake RD/B does not cause any problem in shifting operation. Owing to the delayed engagement of the reduction brake RD/B, simultaneous engagement of the reduction brake RD/B with engagement of the direct clutch D/C can be avoided.

III Range

If one wishes engine braking at high vehicle speed, the driver shifts the manual valve 38 to III range position. Then, the computer controls the shift solenoids A, B and C in order to shift the automatic transmission among the first, second and third gear positions in accordance with varying operating condition. The overrunning clutch solenoid 40 is turned OFF when the engine throttle opening degree is smaller than a predetermined value, for example, 1/16 of the fully opened throttle opening degree, the overrunning clutch OR/C is engaged. This causes engine braking at the second or third gear position.

If, during running at the fifth or fourth gear position with the manual valve 38 placed at D position, the driver shifts the manual valve 38 to III range position, the auxiliary gearing 4 shifts from the high gear position to the low gear position in the same manner as it does during 4-3 downshift. However, the manual valve 38 allows the port 38III to output the line pressure. Thus, this line pressure is supplied via the fluid line 111, shuttle valve 112, fluid line 161 to the chamber 66a of the reduction timing valve 66 and the back-up chamber of the accumulator 68. As a result, the spool 66b of the reduction timing valve 66 is urged by the line pressure supplied to the chamber 66a to assume the upper position thereof where the bypass line 163 is allowed to communicate with the fluid line 157 upstream of the one-way orifice 160 and thus opened. Since the bypass line 163 is opened, the hydraulic fluid is supplied also to the orifice 162 of the bypass line 163 and then to the reduction brake RD/B. Since the line pressure is supplied via the fluid line 161 to the back-up chamber of the accumulator 68, the pressure modulating characteristic revealed by the accumulator 68 is affected not only by the force of the spring 68a but also by the hydraulic pressure supplied to the back-up chamber of the accumulator 68.

Referring to FIG. 3, two-dot chain line $P_E$ shows the variation in hydraulic pressure supplied to the reduction brake RD/B during shifting of the auxiliary gearing 4 from the high gear position to the low gear position after the manual valve 38 has been shifted to III range position Initially, the hydraulic pressure supplied to the reduction brake RD/B jumps to a value determined by the return spring of the reduction brake RD/B, causing the servo piston of the reduction brake RD/B to stroke. Subsequently, the hydraulic pressure supplied to the reduction brake RD/B jumps to a value that is determined by the sum of the force of the spring 68a and the force due to the line pressure supplied to the back-up chamber of the accumulator 68. Then, the hydraulic pressure increases at a rate, with respect to time, that is determined by the sum of the internal diameter of the one-way orifice 160 and the internal diameter of the orifice 162. Upon termination of the stroke of the accumulator piston 68a, the hydraulic pressure supplied to the reduction brake RD/B jumps to a value as high as the line pressure $P_L$. Since, the hydraulic pressure supplied to the reduction brake RD/B reaches the value $P_2$ at a moment $t_0$ prior to the moment $t_2$ owing to the additional flow supply through the bypass line 163 and the presence of the back-up pressure in the back-up chamber of the accumulator 68, the reduction brake RD/B is engaged quickly.

Since engine braking is urgently demanded when the driver shifts the manual valve 38 to III range position, this demand is not met if the engagement of the reduction brake RD/B is delayed from the release of the direct clutch D/C. However, as discussed above, the reduction brake RD/B is quickly engaged in timed relationship with the release of the direct clutch D/C. As shown in FIG. 3, the moment $t_0$ when the engagement of the reduction brake RD/B is initiated occurs while the accumulator piston 68b is in the process of its stroke, the rate at which the hydraulic pressure supplied to the reduction brake RD/B is not high enough to cause an engagement shock of the reduction brake RD/B. Thus, the shift is effected without any substantial shock.

II Range

If one wishes engine braking at the second or first gear position, the driver shifts the manual valve 38 to II range position. Then, the computer controls the shift solenoids A, B and C to cause the automatic transmission to shift between the second and first gear positions. The overrunning clutch solenoid 40 is turned OFF when the throttle opening degree becomes smaller than the predetermined value, namely 1/16 of the fully opened throttle opening degree, causing the overrunning clutch OR/C to be engaged. The manual valve 38 allows the port 38II to output line pressure with the port 38III keeping on outputting the line pressure. The line pressure is supplied from the port 38II to the pressure reduction valve 72 where a pressure reduction is effected. The reduced pressure from this valve 72 is supplied to the fluid line 140 as a low reverse brake pressure.

During running at the first gear position, the first and second shift valves 42 and 44 have their spools 42b and 44b held in their upper positions, respectively, the hydraulic pressure within the fluid line 140 is supplied via the fluid lines 129, 124 and shuttle valve 115 to the low reverse brake LR/B, causing same to be engaged. As a result, the automatic transmission establishes engine brake running status at the first gear position. Since the hydraulic pressure supplied to the Low reverse brake LR/B is reduced upon establishing the first gear, an engagement shock of the low reverse brake LR/B is suppressed although the low reverse brake LR/B has a large capacity required for reverse drive.

During running at the second gear position, the first shift valve 42 takes the illustrated position viewing in FIG. 1A, the fluid line 124 is isolated from the fluid line 129 and allowed to communicate with the drain port 42f, releasing the low reverse brake LR/B. Since, under this condition, the overrunning clutch OR/C is kept engaged, the automatic transmission establishes engine brake running status at the second gear position.

During running at the fifth gear position, if the driver shifts the manual valve 38 to II range position, the automatic transmission shifts from the fifth gear position directly to the second gear position bypassing the fourth and third gears. This 5-2 downshift requires that the auxiliary gearing 4 shift from the high gear position to the low gear position in addition to a shift in gear position in the main gearing 3. Detailed description regarding the shift effected in the auxiliary gearing 4 is hereby omitted since the shifting process is the same as that upon manipulating the manual valve 38 from D range position to II range position. Thus, the following description concentrates on the shifting process taking place in the main gearing 3.

Assuming now that the automatic transmission is at the fifth gear position, the first shift solenoid is turned ON to cause the spool 42b of the first shift valve 42 to take the upper position thereof, and the second shift solenoid B is turned OFF to cause the spool 44b of the second shift valve 44 to take the illustrated position viewing in FIG. 1B, and the overrunning clutch solenoid 40 is turned ON, causing the spool 62b of the overrunning clutch control valve 62 to take the upper position thereof viewing in FIG. 1B. As a result, the forward clutch F/C, high clutch H/C, servo apply chamber 2S/A, servo release chamber 3,4S/R and servo apply chamber 5S/A are supplied with hydraulic pressures. This causes the automatic transmission to establish the fifth gear. Under this condition, the hydraulic pressure supplied to the servo release chamber 3,4S/R is also supplied via the fluid line 144 and the fluid line 142 to the 5-2 sequence valve 50, holding the spool 50b of this valve 50 to the lower position thereof viewing in FIG. 1A. The hydraulic pressure supplied to the servo apply chamber 5S/A is supplied via the fluid line 150 to the overrunning clutch control valve 62. Since the fluid line 126 is allowed to communicate with the fluid line 150, this hydraulic pressure is supplied via the fluid line 126 to the 5-2 relay valve 48, holding the spool 48b of this valve 48 to the upper position thereof viewing in FIG. 1B.

Under this condition, if the driver shifts the manual valve 38 from D range position to II range position, the computer turns the first shift solenoid A OFF, causing the spool 42b of the first shift valve 42 to shift to the position as illustrated in FIG. 1A, and the second shift solenoid B ON, causing the spool 44b of the second shift valve 44 to shift to the upper position thereof viewing in FIG. 1B. However, the overrunning clutch solenoid 40 is kept ON until the 5-2 downshift is completed. Thus, the spool 62b of the overrunning clutch control valve 62 is held in the upper position thereof. The above-mentioned shift of the second shift valve 44 causes discharge of the hydraulic fluid from the servo release chamber 3,4S/R and high clutch H/C. However, owing to the provision of the one-way orifice 131 in the fluid line 128 and the one-way orifice 143 in the fluid line 144, the hydraulic fluid is discharged at a gradual rate. Thus, the hydraulic pressure remaining in the servo release chamber 3,4S/R holds the spool 50b of the 5-2 sequence valve 50 to the lower position thereof, keeping the fluid communication between the fluid lines 127 and 141. Owing to the above-mentioned shift of the second shift valve 44, the fluid line 127 is allowed to communicate with the D range pressure fluid line 110, allowing the D range pressure to be supplied via the fluid line 167, 5-2 sequence valve 50, fluid line 141, 5-2 relay valve 48, fluid line 125, first shift valve 42, fluid line 126, overrunning clutch control valve 62, and fluid line 150 to the servo apply chamber 5S/A. In this manner, the hydraulic pressure supplied to the servo apply chamber 5S/A is backed up regardless of the states of the shift solenoids A and B. This pressure back-up is held since the hydraulic pressure supplied to the servo apply chamber 5S/A acts on the bottom end of the spool 48b of the 5-2 relay valve 48 to hold the spool 48b of this valve 48 to the upper position thereof.

Subsequently, when the servo apply chamber 3,4S/R is drained, the spool 50b of the 5-2 sequence valve 50 moves back to the illustrated position viewing in FIG. 1A owing to the action of the spring 50a, allowing the fluid line 141 to communicate with the drain port 50c. As a result, the hydraulic fluid supplied to the servo apply chamber 5S/A to back up pressure therein is now discharged via the fluid line 150, fluid line 126, fluid line 125, fluid line 141, and drain port, 50c of the 5-2 sequence valve 50. This causes the spool 48b of the 5-2 relay valve 48 to assume the illustrated position viewing in FIG. 1B. In the previously described manner, the servo apply chamber 5S/A is drained after the servo release chamber 3,4S/R has been drained. This keeps the band brake B/B engaged during the 5-2 downshift. Therefore, the automatic transmission shifts from the fifth gear position to the second gear position directly without establishing the fourth nor the third gear.

Upon completion of the 5-2 downshift operation, the computer turns the overrunning clutch solenoid 40 OFF, causing the overrunning clutch control valve 62 to shift to the illustrated position viewing in FIG. 1B. This causes the fluid line 150 for the servo apply chamber 5S/A to communicate with the drain port 62d and the fluid line 152 for the overrunning clutch OR/C to communicate with the D range pressure fluid line 110. Thus, the D range pressure is supplied to the overrunning clutch OR/C to engage same. This engagement of the overrunning clutch OR/C ensures engine braking. From the preceding description, it will now be appreciated that the 5-2 downshift bypassing the fourth and third gears is assured when the driver shifts the manual valve 38 to II range position, thus producing great engine braking demanded by the driver.

The 5-2 sequence valve 50 is rendered operable to perform the above-mentioned function only when the spool 48b of the 5-2 relay valve 48 is held in the upper position thereof owing to the presence of hydraulic pressure within the servo apply chamber 5S/A during forward drive at the fifth gear position. Thus, since the 5-2 sequence valve 50 is rendered inoperable, the back-up function of the hydraulic pressure within the servo apply chamber 5S/A performed by the 5-2 sequence valve 50 is avoided owing to the provision of the 5-2 relay valve 48.

I Range

If one wishes engine braking at the first gear position, the driver shifts the manual valve 38 to II range position and then turns on a I range switch, not illustrated. Then, the computer turns the shift solenoids A, B, and C ON, and turns the overrunning clutch solenoid 40 OFF when the engine throttle opening degree becomes smaller than the predetermined value, namely 1/16 of the fully opened throttle opening degree. This causes the automatic transmission to shift to the first gear position and establishes engine braking status when the throttle opening degree becomes smaller than the predetermined throttle opening degree.

R Range

If one wishes that the vehicle travel in the reverse direction, the driver shifts the manual valve 38 to R (reverse) position wherein the port 38R only is allowed to communicate with the fluid line 81 to allow output of the line pressure therefrom, and all of the other ports are drained. The line pressure appearing at the port 38R is supplied to the fluid line 88 as the reverse-select hydraulic pressure. The hydraulic pressure within the fluid line 88 is supplied via the shuttle valve 107, fluid line 106 to the chamber 34g of the lock-up control valve 34. This causes the valve 34 to assume the position wherein, the torque converter T/C is conditioned to be operable in the torque converter state.

On the other hand, the hydraulic pressure within the fluid line 88 is supplied to the fluid line 155. Then, this hydraulic pressure within the fluid line 155 is supplied via the shuttle valve 154 and fluid line 153 to the chamber 46d of the third shift valve 46, urging this valve 46 to the position as illustrated in FIG. 1B. In this illustrated position of the third shift valve 46, the direct clutch D/C is released and the reduction brake RD/B is engaged to condition the auxiliary gearing 4 in the low gear position thereof. The hydraulic pressure within the fluid line 155 is supplied via the shuttle valve 112 and fluid line 161 to the chamber 66a of the reduction timing valve 66 and also to the back-up chamber of the reduction brake accumulator 68. This causes the reduction timing valve 66 and the reduction brake accumulator 68 to perform the same functions as they did during III range. Thus, the reduction brake RD/B is quickly engaged to condition the auxiliary gearing 4 in the low gear position thereof without any substantial shock although the reduction one-way clutch RD/OWC does not assist in holding the third sun gear $7_S$ (see FIG. 2). The reduction one-way clutch RD/OWC does not serve as a reaction element during transient phase since the third sun gear $7_S$ tends to rotate in the same direction as it is during engine braking.

When the manual valve 38 is placed at N or P position, the line pressure is supplied from the line pressure fluid line 81 to the fluid line 157 leading to the reduction brake RD/B. Thus, it may be considered that the functions to be performed by the reduction timing valve 66 and reduction accumulator 68 for the purpose of quick engagement of the reduction brake RD/B does not mean anything upon shifting the auxiliary gearing 4 after the manual valve 38 has been shifted from N or P position to R position. However, the reduction timing valve 66 and reduction accumulator 68 proves its effectiveness when the manual valve 38 is placed at R position immediately after the engine has been started with the manual valve 38 placed at N or P position. Under this condition, the auxiliary gearing 4 remains in the neutral state owing to a delay is rising of hydraulic pressure, and thus it is shifted to the low gear position after the reduction brake RD/B is engaged by the hydraulic pressure supplied thereto via the fluid line 157. If there is a considerable period of time until the RD/B is engaged, the auxiliary gearing 4 stays in the neutral state for the considerable period of time, causing a considerable delay until the overall automatic transmission is conditioned for the reverse drive when the manual valve 38 is shifted to R position immediately after the engine has been started with the manual valve 38 placed at N or P position. This causes not only a delay until the vehicle starts moving, but also an engine racing. The engine racing induces a large shock upon selecting R position. These problems become serious when the manual valve 38 is shifted to R position immediately after the engine has been started under cold weather with the manual valve 38 placed at N or P position since the transmission oil increases its viscosity when the environment temperature is very low.

Owing to the arrangement of the reduction timing valve 66 and accumulator 68, the reduction brake RD/B is engaged quickly whenever the manual valve 38 is shifted to R position, thus solving the above-listed problems.

The hydraulic pressure within the fluid line 88 is supplied via the one-way orifice 114 and shuttle valve 115 to the low reverse brake LR/B to engage same, and it is also supplied via the one-way orifice 117 to the reverse clutch R/C to engage same. The other frictional devices of the main gearing 3, namely, the forward clutch F/C, high clutch H/C, band brake B/B, and overrunning clutch OR/C are all drained since they receive hydraulic fluid from the ports 38D, 38III, and 38II of the manual valve 38 which are now drained. Thus, the automatic transmission is conditioned in the reverse drive owing to engagement of the low reverse brake LR/B, reverse clutch R/C, and reduction brake RD/B. The shift solenoids A, B, and C, and overrunning clutch solenoid 40 may be turned ON or OFF when the automatic transmission is in the reverse gear position. However, if they are left turned OFF, the hydraulic fluid is kept drained via the associated drained ports of these solenoids, causing an energy loss in driving the oil pump O/P. Thus, the computer is so programmed as to turn the shift solenoid A, B, C and the overrunning clutch solenoid 40 ON when the manual valve 38 is placed at R position.

The accumulator shift valve 58 is not receiving the hydraulic pressure from the D-range pressure fluid line 110 when the manual valve 38 is placed at R position. This causes the fluid line 149 to communicate with the fluid line 148, rendering the accumulator 56 operable in controlling increase in hydraulic pressure supplied to the reverse clutch R/C when it is to be engaged. The hydraulic fluid directed toward the reverse clutch R/C is restricted by the one-way orifice 117 and then admitted via the fluid line 149, accumulator shift valve 58 and fluid line 148 to the accumulator 56. The hydraulic pressure thus increases gradually while the piston of the accumulator 56 is in the stroke against the force due to the hydraulic pressure within the line pressure fluid line 81. Thus, an engagement shock of the reverse clutch R/C is alleviated, resulting in reduction in a shock taking place when the manual valve 38 is shifted from P or N position to R position.

Figure 4:
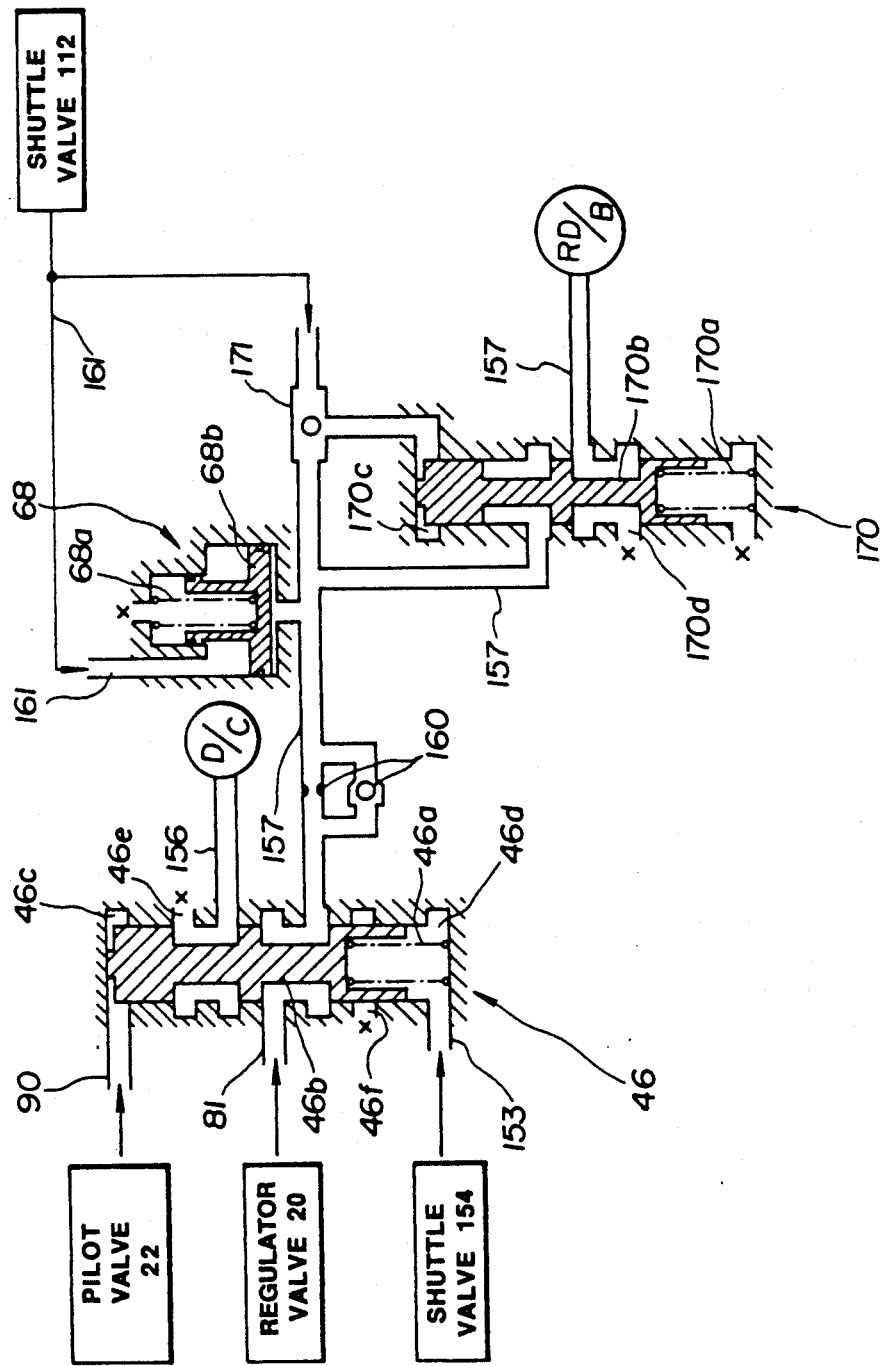
FIG. 4 is a diagram showing a second embodiment according to the present invention.

Referring to FIG. 4, the second embodiment according to the present invention is described. This embodiment is different from the first embodiment illustrated in FIGS. 1A and 1B in that the reduction brake timing valve 66 and the associated bypass line by a gate valve 170. The gate valve 170 is fluidly disposed between an accumulator 68 and a reduction brake RD/B to interrupt transmission of hydraulic pressure from the accumulator 68 to the reduction brake and drain the reduction brake RD/B until the hydraulic pressure from the accumulator 68 increases to a predetermined value $P_S$ (see FIG. 3) when the automatic transmission is set to an automatic drive range, namely D range. This assures a delay until the reduction brake RD/B initiates engagement (moment $t_1$ in FIG. 3). But, since a hydraulic pressure signal as high as a line pressure $P_L$ acts on the gate valve 170 upon setting the automatic transmission to an engine brake running range including a III range and II range or to a reverse drive range (R range), the gate valve 170 allow uninterrupted transmission of the hydraulic pressure from the accumulator 68 to the reduction brake RD/B when the automatic transmission is set to the engine brake running range or the reverse drive range.

Specifically, the gate valve includes a spool 170 biased by a spring 170a to a spring set position, as illustrated. In this position of the spool 170b, the reduction brake RD/B is allowed to communicate with a drain port 170d and thus drained and transmission of hydraulic pressure from the accumulator 68 to the reduction brake RD/B is interrupted. The spool 170b has a pressure acting area exposed to a pressure chamber 170c communicating with an outlet of a shuttle valve 171 whose two inlets communicating with a fluid line 157 at a portion upstream of the gate valve 170 and a fluid line 171 connected to an outlet of a shuttle valve 112.

The setting of the spring 170a is such that it allows movement of the spool 170b from the illustrated position down to a second position when the hydraulic pressure within the pressure chamber 170c increases to the predetermined value $P_S$ that is far lower than the line pressure $P_L$. In the second position of the spool 170b, the reduction brake RD/B is isolated from the drain port 170d and uninterrupted transmission of the hydraulic pressure from the accumulator 68 to the reduction brake RD/B through the fluid line 157 is allowed.

When the automatic transmission is set to the automatic drive range, no hydraulic pressure builds up in the reduction brake until the hydraulic pressure increases to the predetermined value $P_S$. When the hydraulic pressure exceeds the predetermined value $P_S$, the spool 170b shifts to the second position, and thus the hydraulic pressure is transmitted to the reduction brake RD/B.

Upon setting the automatic transmission to the engine brake running range, a so-called II range pressure is supplied to the fluid line 161 and then to the pressure chamber 170c. Since this pressure is as high as the line pressure $P_S$ and higher than the predetermined value $P_S$, the spool 170b shifts to the second position without any delay, thus allowing uninterrupted transmission of the hydraulic pressure through the fluid line 157.

What is claimed is:

1. An automatic transmission for a motor vehicle with an engine, the automatic transmission being shiftable between an automatic drive range and an engine braking range and having a reverse drive range, the automatic transmission, comprising:

a main gearing;

an auxiliary gearing drivingly connected to said main gearing, said auxiliary gearing having a high gear position and a low gear position, and being shiftable from said high gear position to said low gear position owing to disengagement of a first frictional device and engagement of a second frictional device, said auxiliary gearing including a rotary member and a one-way clutch means for acting on said rotary member to complement an action of said second frictional device during engine driving in the automatic drive range;

means for controlling a transient increase in a hydraulic pressure acting on said second frictional device in a predetermined pattern when the automatic transmission has the automatic drive range such that said one-way clutch means becomes operative to act on said rotary member before said second frictional device grips said rotary member;

said transient increase controlling means including means for changing said predetermined pattern to a second pattern upon setting the automatic transmission to at least one of the engine brake running range and the reverse drive range such that said second frictional device grips said rotary member immediately after disengagement of said first frictional device.

2. An automatic transmission as claimed in claim 1, wherein said transient increase controlling means includes an accumulator operable subject to a back-up pressure, and said changing means includes means for modifying said back-up pressure.

3. An automatic transmission as claimed in claim 1, wherein said transient increase controlling means includes an accumulator operable subject to a back-up pressure, and said changing means includes means for increasing said back-up pressure when the automatic transmission is set to one of the engine brake running range and reverse drive rage, and valve means fluidly disposed between said accumulator and said second frictional device for interrupting transmission of said hydraulic pressure to said second frictional device and draining said second frictional device until said hydraulic pressure increases to a predetermined value when the automatic transmission is set to the automatic drive range, but allowing uninterrupted transmission of said hydraulic pressure to said second frictional device.

* * * * *